United States Patent [19]
Gantt

[11] Patent Number: 6,016,147
[45] Date of Patent: *Jan. 18, 2000

[54] METHOD AND SYSTEM FOR INTERACTIVELY DETERMINING AND DISPLAYING GEOMETRIC RELATIONSHIPS BETWEEN THREE DIMENSIONAL OBJECTS BASED ON PREDETERMINED GEOMETRIC CONSTRAINTS AND POSITION OF AN INPUT DEVICE

[75] Inventor: Brian D. Gantt, Travis County, Tex.

[73] Assignee: Autodesk, Inc., San Rafael, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/744,241

[22] Filed: Nov. 5, 1996

Related U.S. Application Data

[63] Continuation-in-part of application No. 08/436,158, May 8, 1995, Pat. No. 5,572,639.

[51] Int. Cl.[7] .................................................. G06T 15/70
[52] U.S. Cl. ............................................ 345/420; 345/419
[58] Field of Search ..................................... 345/145, 483, 345/421, 422, 435

[56] References Cited

U.S. PATENT DOCUMENTS

| | | |
|---|---|---|
| 4,951,231 | 8/1990 | Dickinson et al. . |
| 5,101,436 | 3/1992 | DeAguiar et al. . |
| 5,123,087 | 6/1992 | Newell et al. . |
| 5,133,052 | 7/1992 | Bier et al. . |
| 5,237,647 | 8/1993 | Roberts et al. . |
| 5,325,475 | 6/1994 | Poggio et al. . |
| 5,371,845 | 12/1994 | Newell et al. . |
| 5,396,590 | 3/1995 | Kreegar . |
| 5,513,303 | 4/1996 | Robertson et al. ...................... 345/419 |
| 5,712,965 | 1/1998 | Fujita et al. .............................. 345/419 |
| 5,734,805 | 3/1998 | Isensee et al. ........................... 345/433 |
| 5,734,806 | 3/1998 | Naryanaswami ........................ 345/421 |
| 5,734,807 | 3/1998 | Sumi ....................................... 345/433 |

*Primary Examiner*—Mark R. Powell
*Assistant Examiner*—Huedung X. Cao
*Attorney, Agent, or Firm*—Gates & Cooper

[57] ABSTRACT

A system and method of interactively determining and displaying geometric relationships between three dimensional (3D) objects includes the steps of and apparatus for detecting the position of an input device, moving a selected 3D graphic object relative to a graphic pointing symbol in a 3D representation based on position of the input device, determining if the selected graphic object is moved to occlude an underlying 3D graphic object, and positioning and displaying the selected graphic object with respect to the underlying graphic object according to predetermined geometric constraints and the position of the input device. The system and method further dynamically moves and displays the selected graphic object according to movement of the input device and the predetermined geometric constraints while the selected graphic object occludes the underlying graphic object. The selected graphic object clings to the underlying graphic object, and is moved about the underlying graphic object corresponding to movement of the input device. The selected object may be a logical object, such as a logical camera or light source. For example, a camera object is placed based on a geometric element, and the display is changed to the viewpoint of the camera. The operator then interactively changes the display simply by moving the input device, where the display is automatically updated based on movement of the camera object.

16 Claims, 24 Drawing Sheets

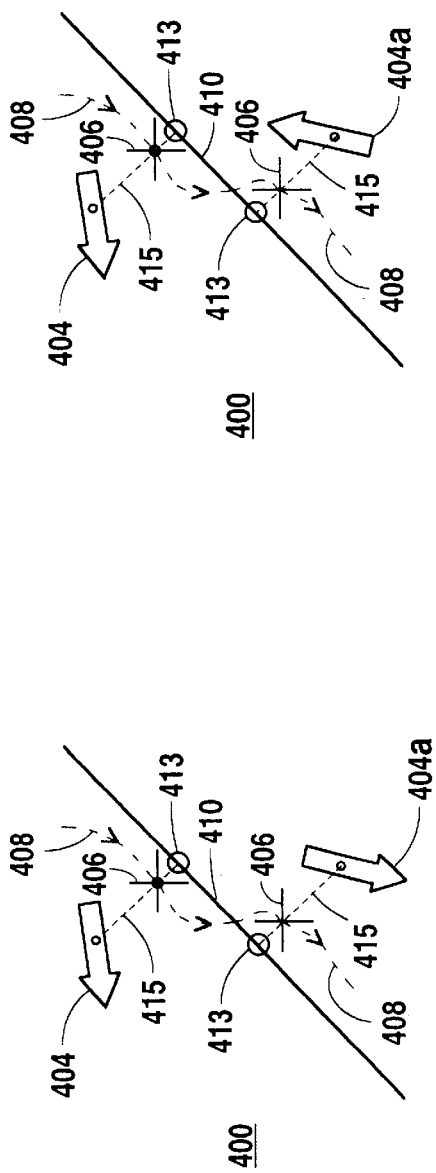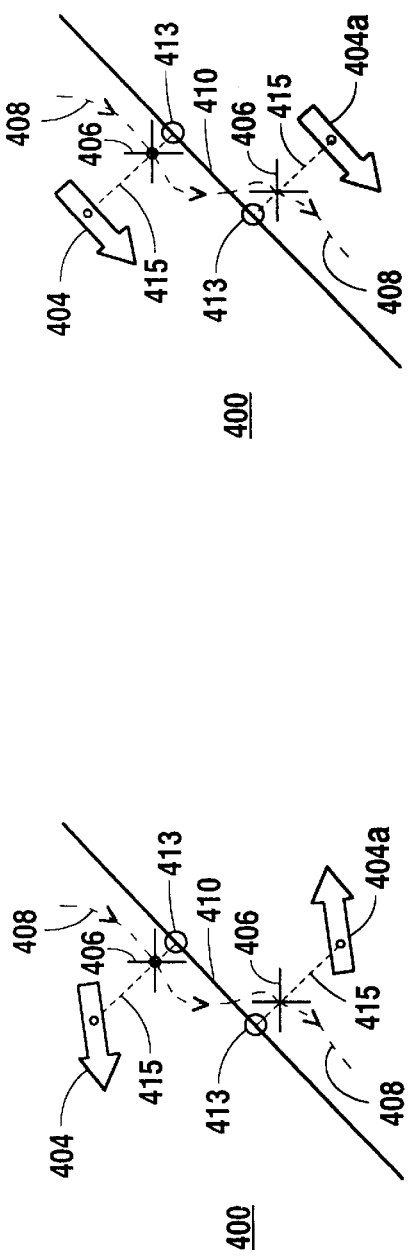

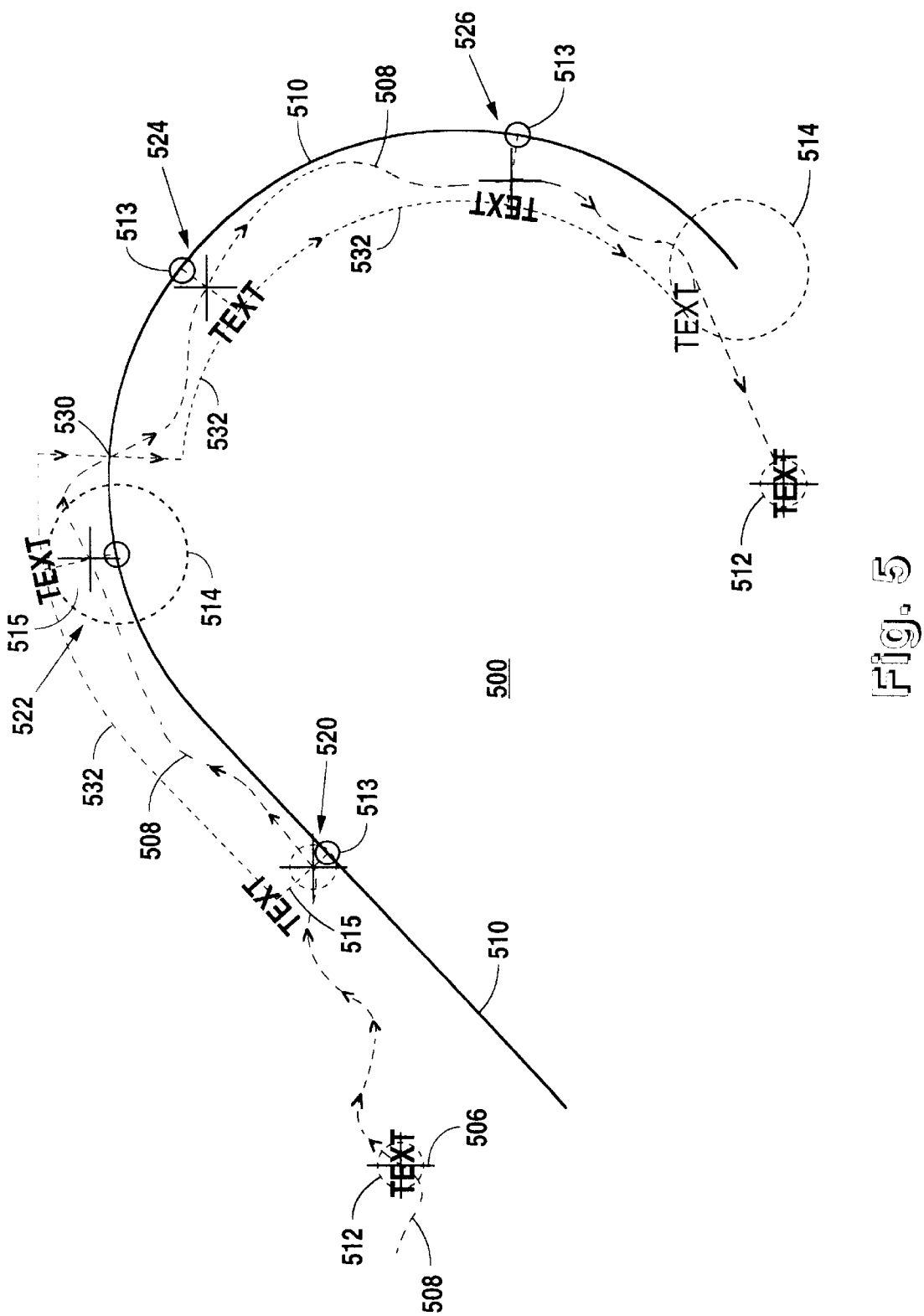

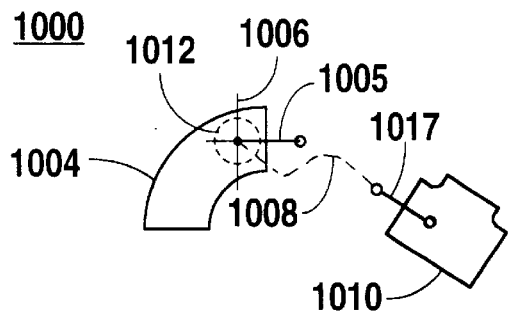
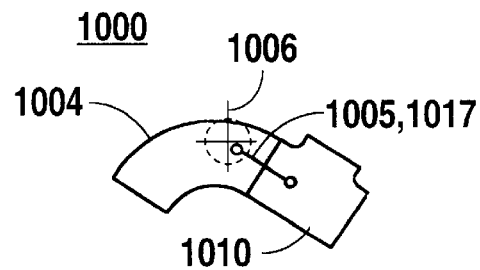
Fig. 10A        Fig. 10B
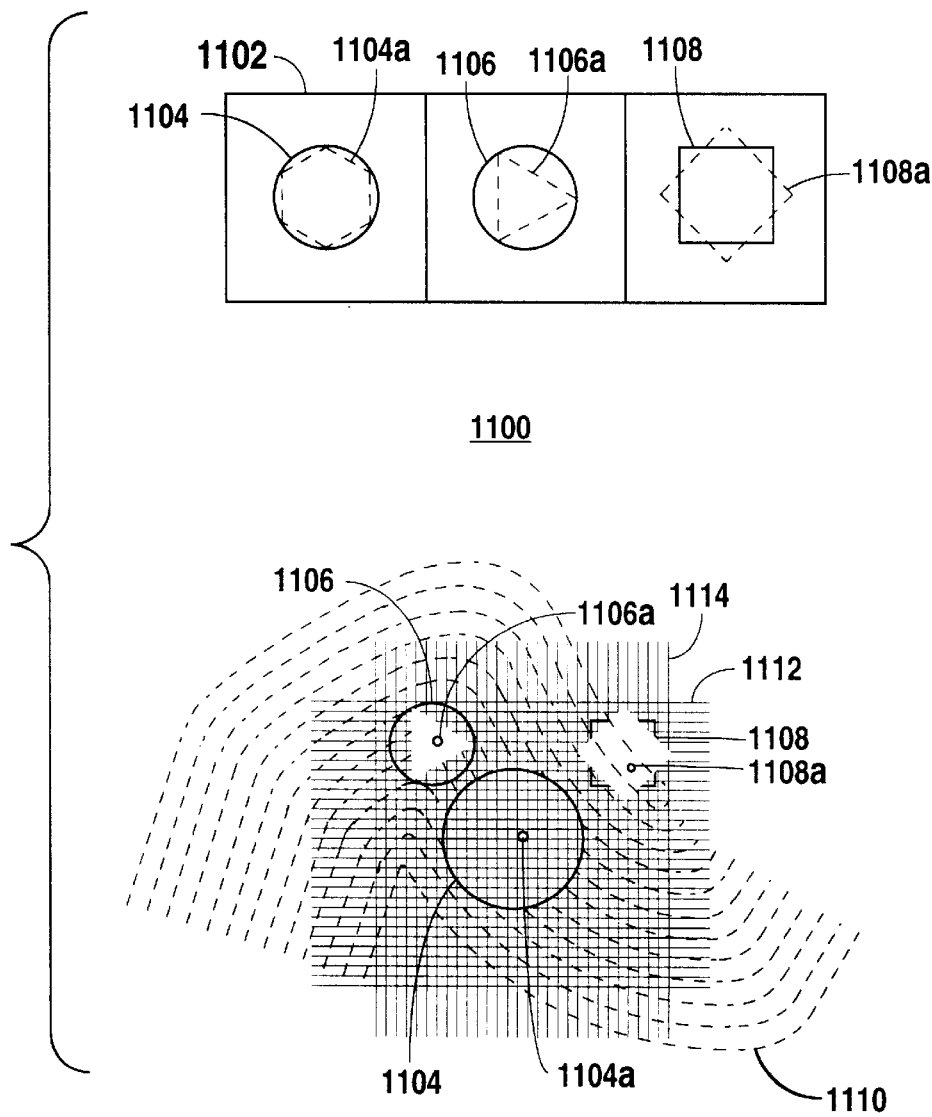
Fig. 11

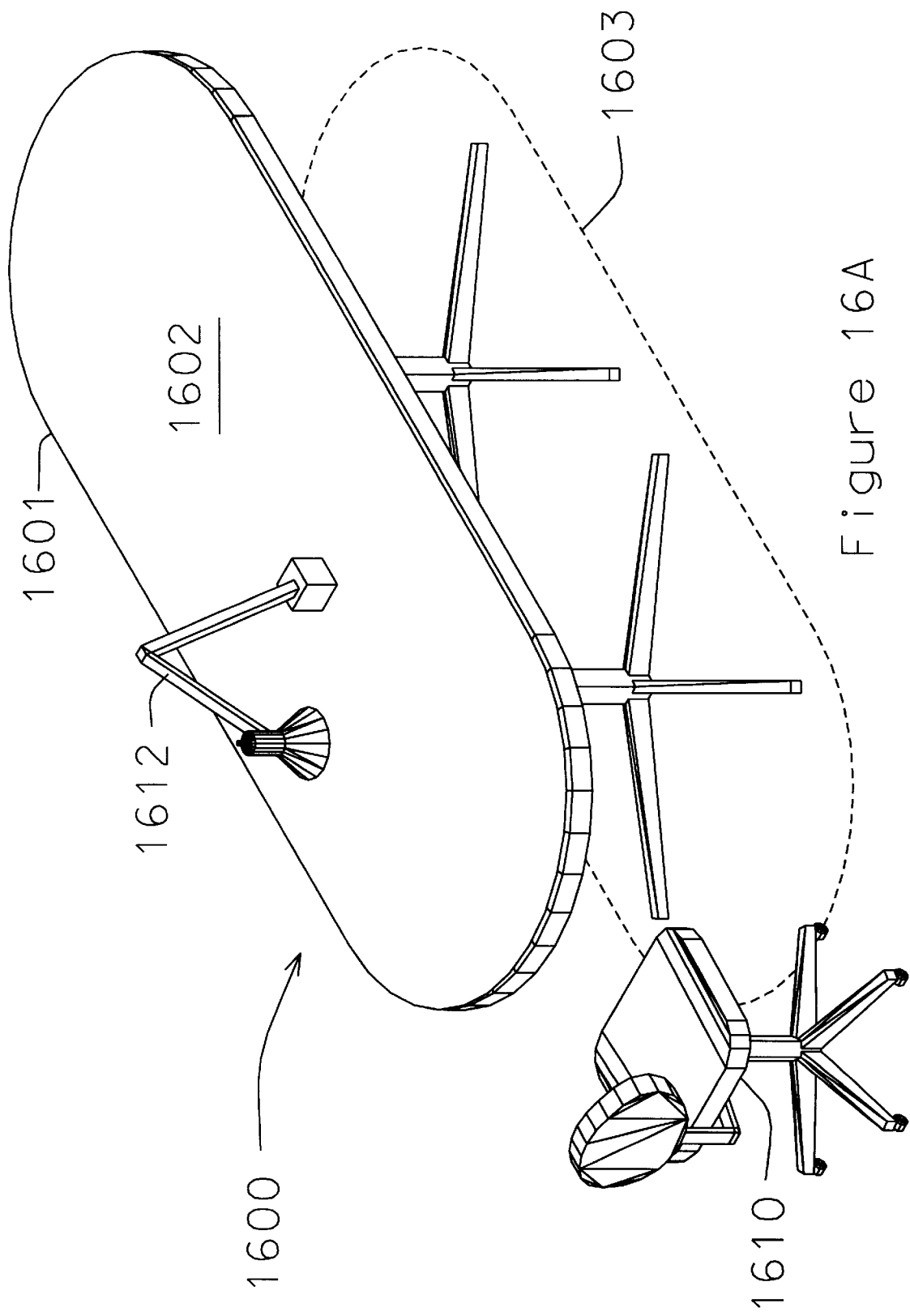

METHOD AND SYSTEM FOR INTERACTIVELY DETERMINING AND DISPLAYING GEOMETRIC RELATIONSHIPS BETWEEN THREE DIMENSIONAL OBJECTS BASED ON PREDETERMINED GEOMETRIC CONSTRAINTS AND POSITION OF AN INPUT DEVICE

CROSS REFERENCE TO RELATED APPLICATIONS

This application is a continuation-in-part of pending U.S. Application entitled "Method And Apparatus For Interactively Manipulating and Displaying Presumptive Relationships Between Graphic Objects" by the same inventor, Ser. No. 08/436,158, filed May 8, 1995, which will issue on Nov. 5, 1996 as U.S. Pat. No. 5,572,639.

FIELD OF THE INVENTION

The present invention relates to computer aided design and drafting systems, and more particularly to interactively determining and displaying geometric relationships between three dimensional objects based on predetermined geometric constraints and position of an input device.

DESCRIPTION OF THE RELATED ART

At the present time, the assembly of three dimensional (3D) objects to realistically depict physical models is based upon the utilization of geometric constraints that roughly correspond to real world physical behavior. Traditional computer-aided drafting (CAD) methods for assembling these types of digital models require that a computer operator indicate where and how 3D objects are to be positioned in digital space. The operator indicates a position and orientation for the 3D graphical objects and the computer subsequently produces the digital representation suggested by operator input. If the resulting representation is not correct, the operator deletes the incorrect graphics from the digital model and attempts to create a new representation that meets the desired criteria.

An operator may press a button on a mouse to provide a "tentative point" to the computer to suggest where an object might be placed in 3D space. Depending upon the type of CAD software used, a second tentative point may be required to fully specify the 3D point of interest. The computer responds by placing a graphic "crosshair" to indicate a precise location nearby the point suggested by the operator. If the point suggested by the operator is close to a key coordinate value from an existing 3D object in the digital design file, the computer places the tentative point at that location and redisplays the graphic object selected in a specified "highlight" color. If the resulting location is desired by the operator, a key is depressed on an input device to accept the tentative point and the specific coordinate values are used one time in an immediately following 3D object input operation. If the coordinate location and associated graphic object determined by the computer is not desired by the operator, the mouse button is pressed again to request a different tentative point.

Some CAD software provides a mode of interaction where the software automatically suggests geometrically interesting points near the cursor for consideration in CAD drafting operations. However, these systems work best in two dimensions where there is little ambiguity regarding the true location of the "interesting point" displayed.

Computer programs exist to create and edit solid models in three dimensions. These solids modeling programs provide interactive tools that allow the merging of individual graphic objects such as a cylinder, block, torus or other objects in order to create a new solid model object definition. Some of these programs offer interactive tools to provide a surface to surface cling mode that constrains the motion of one object's surface to the surface of another. However these programs lack the ability to define a constrained assembly methodology.

Once the user accepts the coordinate location suggested by the computer, a second operation usually follows whereby the 3D object is moved to a correct geometric position, and possibly even rotated about one or more specific coordinate axes to produce the desired orientation. Once again, a tentative point mode of interaction may be used to establish the point of rotation, or else a default coordinate value indicating the origin point of the 3D object may be employed as a rotation point. To specify the exact degree of rotation, another tentative point may be obtained, a specific angle value may be provided by the operator, or else the operator may seek an orientation that is acceptable by moving the mouse, which in turn rotates the 3D object until a satisfactory orientation is obtained. Due to the difficulty of interacting in virtual 3D space with only two dimensional (2D) input devices, such as a mouse or the like, and output devices, such as a video monitor or the like, an operator may have to construct temporary geometric elements to fully constrain placement and orientation. Once the 3D object is in place, the temporary construction geometry is deleted from the 3D model.

To insure that the 3D model has been correctly assembled, the CAD operator desires to visualize the model from different perspective points. In present art, this is accomplished by indicating a point of interest in 3D space using one of the previously described coordinate specification techniques, setting a view distance from the point, specifying the axis of rotation for either the view screen or the virtual world, then either providing an explicit angle value or else interactively changing the viewer's perspective point by moving the mouse or other input device. In general, this method of view manipulation is difficult to master as it requires advance knowledge of how the graphic display system is going to respond to modifications to the underlying mathematical transformation representing 3D space on a 2D video screen.

It is very difficult to create 3D designs using 2D tools, such as a mouse and a computer screen. Consider, for example, the difficulty of placing a 3D chair object at a proper location around a 3D table object. The operator typically uses one perspective, such as a top perspective, to place the chair object to a position that appears to be located adjacent the table object. After placing the chair, however, the operator changes perspective to a side view and discovers that the chair object was placed above the table object and not properly on the floor. The operator must then move the chair object down to the floor. Further, the operator may have to reposition the chair object one or more times to place the chair object at a desired location with respect to the table object. Even if more than one view is provided at a time, the operator is typically constrained to work in one view at a time, and thus must typically manipulate the object in several views before the proper geometric relationship is achieved.

It is an objective of the present invention to more rapidly produce computerized representations of 3D models that conform to predefined specifications for appearance, content and relationships among the graphic objects that are assembled to form the design.

It is a further objective of the present invention to eliminate the duty on the part of the computer operator of providing the correct position and orientation of graphic objects to assemble a valid 3D model of a design or system through a rule-based database to verify the juxtaposition of 3D objects within the intended context of the design.

It is still a further objective of the present invention that the behavior of the graphics objects be constrained by a set of geometric specifications that are constructed in advance of digital data input operations and are encoded in the definition of the 3D objects.

It is still a further objective of the present invention that the position, orientation and projection of the physical model displayed on the screen can be easily altered through the intelligent manipulation of perspective points, viewing distances and rotations of the view without an operator having to master complex, multiple step commands for view manipulation.

It is still a further objective of the present invention that external procedures for the verification of 3D object relationships can occur during digital data input operations to avert the creation of invalid representations of designs.

SUMMARY OF THE INVENTION

A method and system according to the present invention replaces the multiple step mode of 3D coordinate input with a single step assembly methodology defined for each 3D object to be included in the 3D design. In particular, most positions and orientations for 3D objects are tied to the movement of the input device or cursor. A computer system implemented according to the present invention continuously calculates geometric relationships near the cursor for the operator to accept or reject. Predefined rules are maintained to limit the relationships of interest for 3D objects and to perform the geometric computations that provide other related functions such as tangent, offset, parallel, alignment, end point, major vector, divided segment, extended segment, intersection and other specific coordinate locations derived from the graphic objects that comprise a digital 3D design.

In general, there are two classes of intelligent assembly: explicit and inferred. In the case of explicit assembly, there are few options for the positioning of objects, sometimes only one. The case of a grounded electrical plug and outlet is an example of a single orientation. A valve installed in a pipe offers an example of a somewhat less explicit orientation of one object to another. In the case of planning office space, the number of candidate objects and their potential arrangements preclude an explicit definition of assembly. For many of these objects, assembly is inferred from the position of surrounding objects. For the case of a chair, it may sit under a desk, alongside a wall, next to a table or couch, or stand by itself. The position of a chair object into the office design depends upon a number of factors, including aesthetic preference.

Explicit assembly is handled by specifying a few key points or vectors in the geometric definition of the 3D object. Inferred assembly requires more flexibility and variety in the definition of the constraint geometry elements.

In addition to handling 3D objects that represent physical entities, a system and method according to the present invention also handles logical 3D objects such as perspective viewpoints and light sources. An interface is provided to accommodate external rule-based input verification procedures, and the newly input 3D objects inherit specific characteristics of the related 3D object already in the design. A system and method according to the present invention eliminates much of the labor required for the interactive selection, positioning, orientation and confirmation of 3D objects used in digital models of physical reality.

The present invention provides a method for positioning and displaying 3D objects within the virtually real space of a digital CAD system through geometric affinity between existing and new objects within a 3D design. A system and method according to the present invention uses predefined geometric relationships between 3D objects defined by geometric elements and other related 3D objects in the design and position of an input device, such as a mouse or trackball. The invention also contemplates that logical objects, rather than physical objects, may also be placed into an assembly of 3D objects. Such logical objects include things like the viewer's perspective point, the camera angle used, the location of light sources, etc.

A geometry processing engine written according to the present invention interactively determines the desired positional relationship between graphic 3D objects and automatically generates the correct representation based on geometric constraints and position of the input device. The task of the CAD operator is shifted from instructing the computer on how to position and orient 3D objects to accepting or denying a geometric relationship interactively determined by the computer. Input parameters define constraints that presume the desired layout, so that more often than not the operator accepts the positions of the graphic objects and continues with the next task. This eliminates a great deal of time spent by the operator in constructing geometric relationships between 3D objects.

"Magnetism" is a metaphor that is used for the interactive graphic behavior of the elements. For example, the active position on the screen is controlled by the movements of a pointing device, usually a mouse, trackball, or similar type device. When a 3D object is to be added to a drawing, the object is moved with the cursor and automatically positioned with respect to any appropriate 3D object whenever the cursor partially occludes or passes over an underlying or existing 3D object. As the operator moves the object around in a 3D representation, such as on a computer screen, and as the cursor is moved to partially occlude other graphic elements, the graphic engine dynamically alters the position of the 3D object to agree with the assembly specifications with respect to the currently occluded element. When an occluded element is active, the new 3D object "clings" to the element at a specific location, or else is moved along the extent of the geometric constraint within the occluded element following movements of the cursor (as moved by the input device). To a CAD operator, the 3D object appears to be "magnetically" attracted to the regions surrounding other 3D objects of the drawing. To cancel the magnetic cling behavior, the operator moves the cursor away from the existing 3D object a certain predetermined distance, whereupon the new 3D object behavior reverts to moving with the cursor and automatically aligning with other appropriate 3D objects.

As an option, the 3D object partially occluded by the cursor may be sectioned or cut away a certain distance to provide an exact space to accommodate the new 3D object. The distance can be defined in a variety of ways including the graphic extent of the 3D object, by a closed space definition that is included in the definition of the symbol, and by certain 3D geometric elements included in the definition of the 3D object. The present invention includes the capability to automatically align, orient and cut out space for a 3D object.

A method of interactively determining geometric relationships between 3D objects and displaying the 3D objects according to the present invention comprises the steps of detecting the position of an input device, moving a selected 3D graphic object relative to a graphic pointing symbol in a 3D representation according to the position of the input device, determining if the selected graphic object is moved to occlude an underlying 3D graphic object in the 3D representation, and positioning and displaying the selected graphic object with respect to the underlying graphic object according to predetermined geometric constraints and the position of the input device.

The method further may include a step of dynamically moving and displaying the selected graphic object according to movement of the input device and the predetermined geometric constraints while the selected graphic object occludes the underlying graphic object. The dynamically moving and displaying steps may further comprise the steps of clinging the selected graphic object to the underlying graphic object, and rotatably moving and displaying the selected graphic object about the underlying graphic object corresponding to movement of the input device. Occlusion may be based on a predefined geometric graphic element associated with the underlying graphic object. Positioning includes orienting and aligning the selected object according to predefined geometric constraints. Such geometric constraints may be defined in association with graphic constraint elements calculated interactively or may be incorporated in the definition of the graphic object.

A method according to the present invention of interactively displaying a 3D design based on geometric constraints and an input device, comprises the steps of displaying a first 3D graphic object having a defined geometric graphic constraint element in a 3D representation, moving and displaying a second 3D graphic object in the 3D representation relative to correspond to the position of the input device, determining if the second graphic object is moved to occlude the geometric graphic constraint element of the first graphic object, and dynamically positioning and displaying the first graphic object into a geometric relationship with the first graphic object according to predetermined geometric constraints defined by the geometric graphic constraint element and position of the input device.

The second graphic object is any type of graphic object including logical graphic objects such as logical cameras or light sources. For a logical camera object, a method according to the present invention may include steps of viewing the first graphic object from the viewpoint represented by the logical camera object, and manipulating the logical camera object by moving the input device to interactively change the display of the first graphic object according to position of the input device. In this manner, the operator may interactively change the viewpoint of a 3D design simply by moving the input device.

A graphics system for interactively determining geometric relationships between three dimensional objects and displaying the three dimensional objects according to the present invention includes a monitor for displaying graphics, a pointing device for indicating location on the monitor, a memory for storing a database of graphic display information and associated geometric constraints, a processor for executing a geometry processing engine based on the database, the geometric constraints and the position of the pointing device for displaying a representation of 3D graphics on the monitor, where the geometry processing engine detects the position of the pointing device, moves a selected 3D graphic object relative to a graphic pointing symbol on the monitor according to the position of the pointing device, determines if the selected graphic object is moved to occlude an underlying 3D graphic object, and if the selected graphic object occludes the underlying 3D graphic object in the 3D graphics, positions and displays the selected graphic object with respect to the underlying graphic object according to predetermined geometric constraints and the position of said pointing device.

A system and method according to the present invention therefore provides a solution to all of the problems listed above by controlling objects to behave in an "assembly aware" manner. Individual objects added to a design behave in a logical manner that is consistent with their intended utilization, installation procedure or other placement constraints. Since 3D objects behave in a logical manner, the level of knowledge required of the CAD operator knowledge decreases to the point where specialized training is not required. For example, much of the geometric instructions the operator provides to the CAD software to achieve the desired 3D assembly conventions is eliminated. This present invention thus opens an entirely new class of CAD applications that can be utilized by anyone familiar with the basics of computer interaction. Particularly, applications with wide spread appeal can be enabled for relative computer novices. This savings of time translate into higher productivity and drastically less training on the part of the CAD operator.

BRIEF DESCRIPTION OF THE DRAWINGS

A better understanding of the present invention can be obtained when the following detailed description of the preferred embodiment is considered in conjunction with the following drawings, in which:

FIGS. 4A–4D illustrate yet further examples of the cling characteristic using a system according to the present invention;

FIG. 5 illustrates how TEXT is handled in context with other graphic objects;

FIGS. 10A and 10B illustrate alignment of two pipe objects using alignment vectors;

FIG. 11 illustrates the present invention used to implement closed clip region objects for partial deletion of graphic objects in a design;

FIG. 16A is a 3D graphic diagram illustrating placement of 3D furniture objects with respect to an underlying 3D object to create a 3D design;

DETAILED DESCRIPTION OF THE PREFERRED EMBODIMENT

Figure 12:
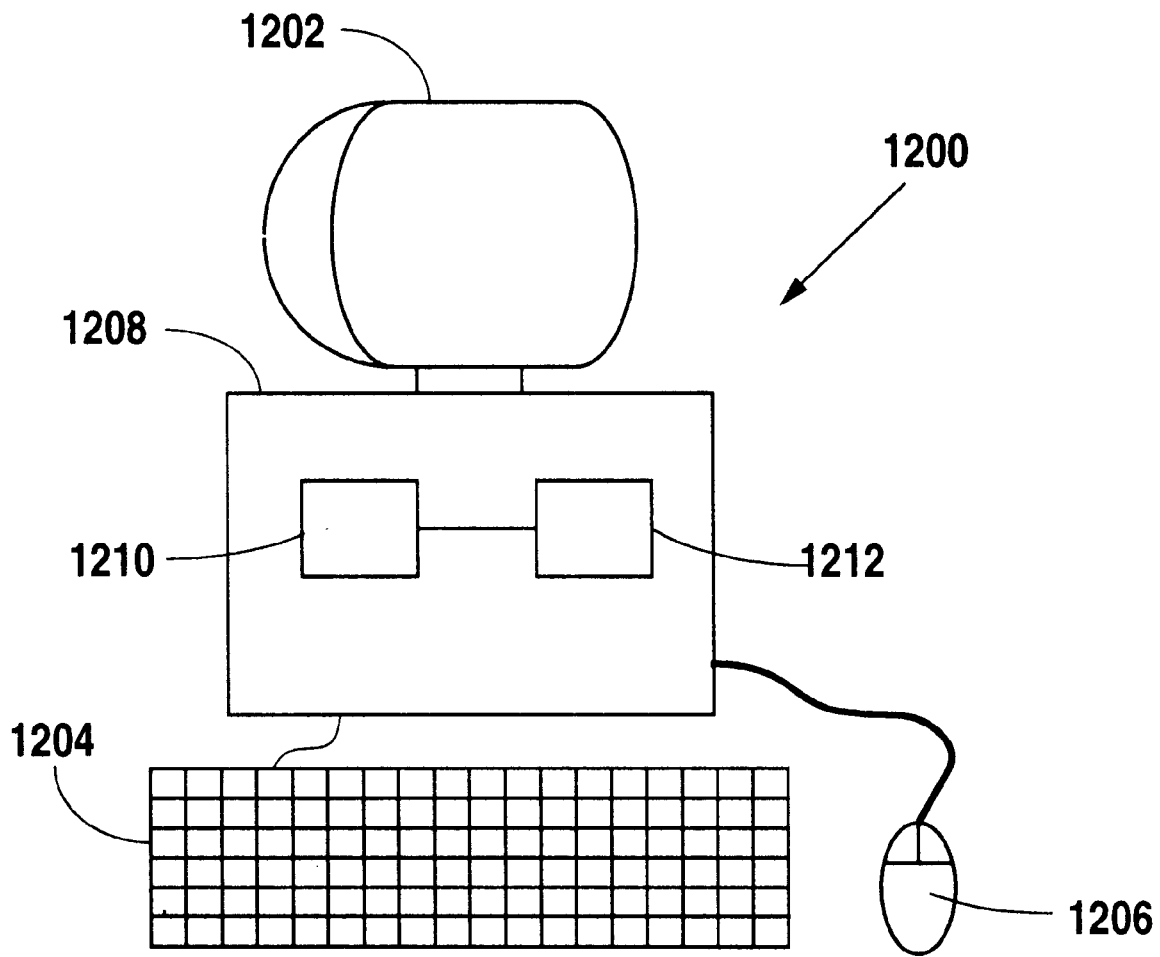
FIG. 12 is a diagram of a computer system implemented according to the present invention.

FIG. 12 illustrates a computer system 1200 implemented according to the present invention. The computer system 1200 may be any comparable computer system capable of operating as a computer aided design and drafting (CAD) system, such as an IBM XT, AT or IBM-compatible computer system or the like. The computer system 1200 includes a display device or monitor 1202 for viewing a graphic environment. A keyboard 1204 is also provided for inputting text, as well as a pointing device 1206, such as a mouse, trackball or other similar device, for manipulating graphic objects on the screen of the monitor 1202. A main system unit 1208 includes the necessary logic for running software and processing commands as known to those skilled in the art. For example, a processor 1210, such as the 80386, i486, Pentium, etc. by the Intel Corporation (Intel), is coupled to memory 1212 for executing software implemented according to the present invention.

The computer system 1200 is preferably implemented as a CAD system according to the present invention by loading software incorporating a geometry processing engine into the memory 1212 for execution by the processor 1208 for receiving input and commands from the keyboard 1204 and pointing device 1206 and generating a graphic output on the monitor 1202. Graphic parameters and geometric relationships are defined in database files stored in memory. It is noted that alternative computer systems and interfaces are contemplated, such as three-dimensional (3D) holographic displays for improved visual representation of the graphic environment.

Figure 1:
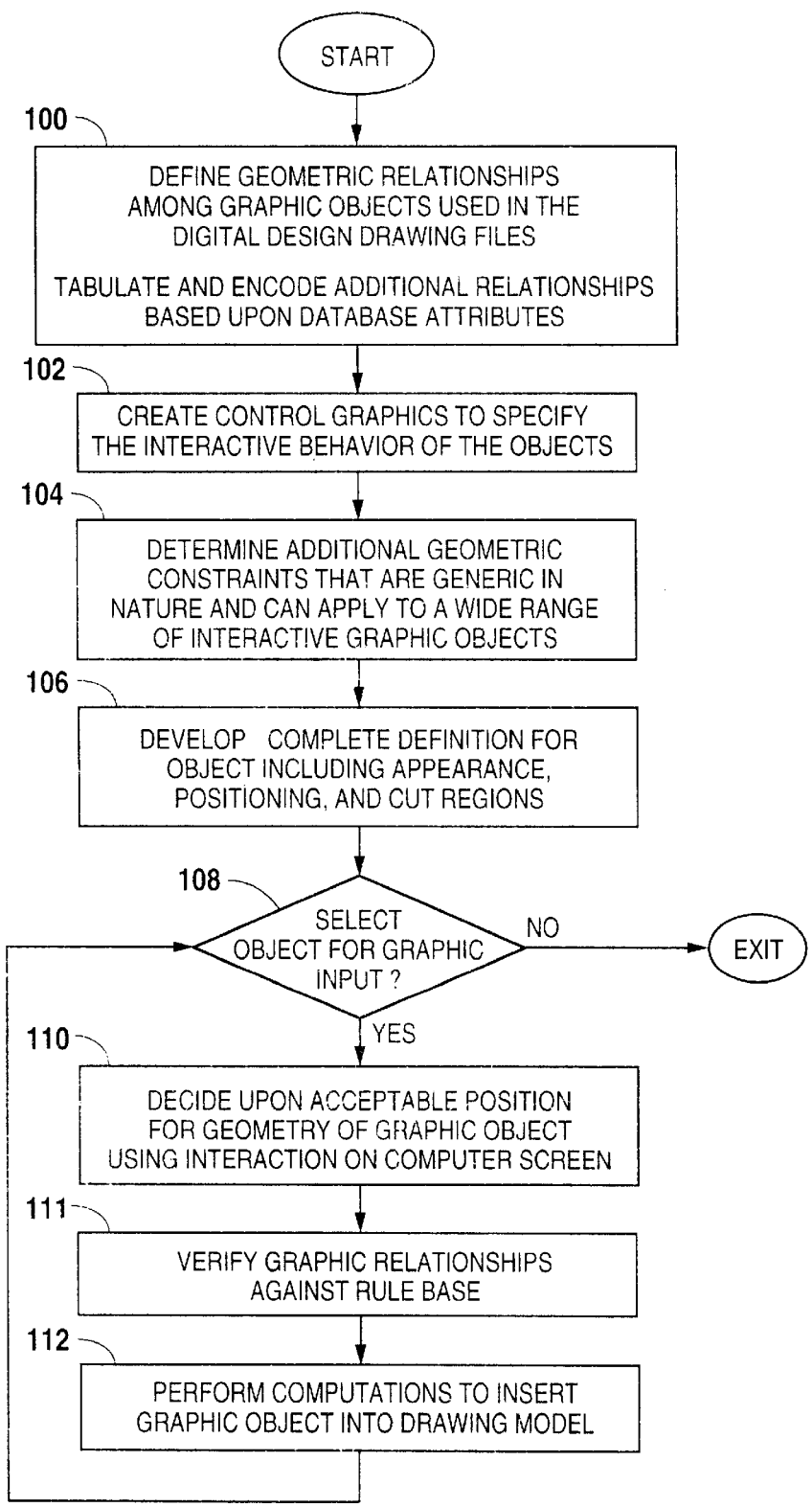
FIG. 1 is a flowchart diagram illustrating operation of a system according to the present invention.

Referring now to FIG. 1, a flowchart diagram is shown illustrating operation of a system according to the present invention. The flowchart illustrates that the system is designed to create representations that conform to predefined specifications for the geometric and logical relationships that exist among graphic objects in a computer based drawing representing a design, system or model.

In step 100, the applicable specific geometric relationships such as alignment, offset, etc. are defined for each entity that is represented in one or more drawings. Additionally, any relationships that are based upon associated database attributes are tabulated and encoded. In the next step 102, the graphic objects used as geometric constraint components are created according to specifications for the desired functional behavior. In the next step 104, any additional generic geometric constraints that may apply are determined and tabulated.

In the next step 106, the constraint definitions for each object are created as a collection of digital data that appears in a recognizable form such as a graphic symbol. Each symbol comprises a series of components, some of which are always displayed on a computer screen as the normal graphic representation of the associated object, some components which are not normally displayed on the screen except as an aid to their definition, some logical verification components are tabulated as a digitally encoded rule-based record that is associated with the symbol, and some components are stored as textual specification data that is provided to the control software at the moment the object is activated for inclusion in the design, system or model. The textual data may be any one of several formats, such as ASCII (American Standard Code for Information Interchange) or the like.

In the next step 108, an object is selected for input by the operator using any of several techniques including the selection of a graphic icon from a computer screen (FIG. 2) that represents the object, typing in a keyed command that causes the object to become active, or any other means of indicating to a software program that the desired object is to be added to the drawing using the geometry processing engine.

In the next step 110, the object is read into the geometry processing engine and graphically interacts with other objects according to the specifications provided in the symbolic definition and the constraints of any external database attribute or knowledge based verification process. Feedback is provided to the operator to indicate the integrity of the proposed relationships between the new object and existing graphic objects in the digital drawing. Such feedback includes changing the color of the affected graphic objects, providing additional on-screen motions to the affected symbol to indicate a correct or incorrect validation result, or providing unique auditory sounds to indicate a correct or incorrect validation result. In the next step 111, the graphic representations are verified against a rule-based database.

In the next step 112, the object is accepted by the operator as being a correct representation at which point the geometry engine inserts the symbol in context into the graphic representation of the design, system or model, taking into account all geometric control specifications provided with the symbolic definition. Once the new graphic object is added to the existing digital file, the sequence of operations returns to step 108 and drafting operations continue. In particular, steps 108–112 are repeatedly performed in sequential manner until the operator has added all desired objects, and operation is then completed.

Figure 2:
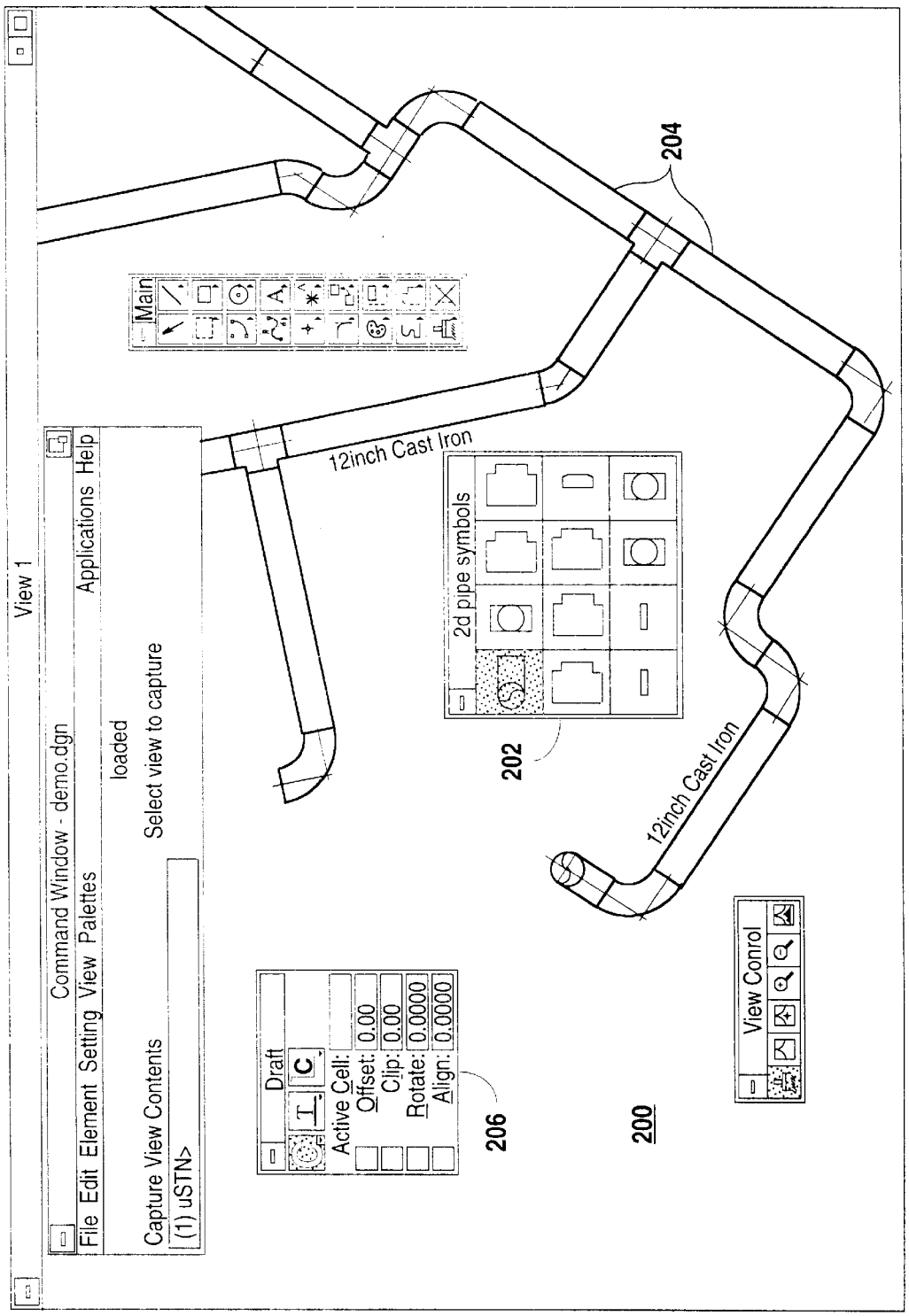
FIG. 2 is a representative computer screen that an operator interacts with using a pointing device to create digital drawings.

Referring now to FIG. 2, a representative computer screen 200 is shown in the context of interactive CAD software. Steps 100–106 have previously been performed at this point so that the operator interactively selects objects in step 108 and accepts a selected object in step 112 until a 2D design is completed. The operator selects objects with a cursor as known for window environments, although the present invention is not limited to a windows environment. A tool palette 202 is provided containing one or more icons that indicate the graphic objects that are available for processing by the geometry engine. A series of objects 204 that have been previously placed appear on the screen 200, which in this particular case is a series of pipes for a plumbing system. Of course, other types of objects are contemplated, such as engineering designs, electrical schematics, utility systems such as power generation and distribution grids, chemical processes, etc. The objects 204 thus are represented in the underlying design file. An optional control panel 206 is provided to specify any additional geometric functions that are to apply to the symbolic object. The balance of the screen depicts a typical interactive computer aided design environment.

Figure 3A:
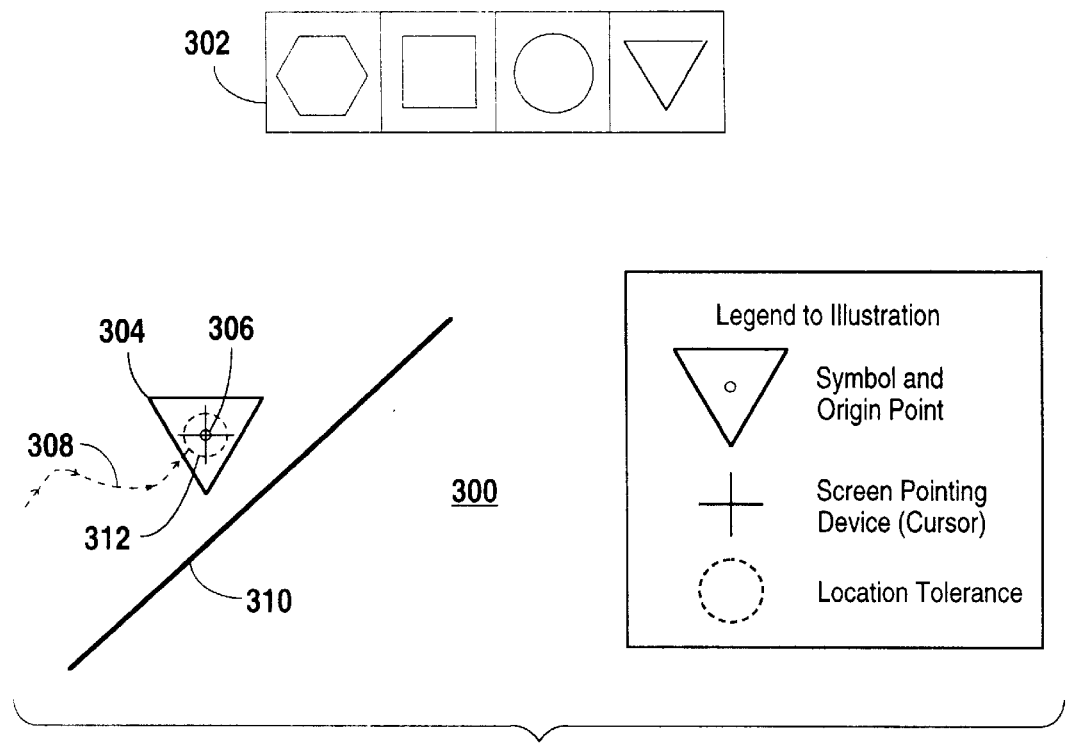
FIG. 3A is a graphic diagram illustrating operations performed by a system according to the present invention.

FIG. 3A is a graphic diagram illustrating operations performed by a system according to the present invention. A computer screen 300, which is similar to screen 200, is shown including a tool palette 302 for selecting graphic objects. The operator selects a symbol from the tool palette 302 and activates an object 304 with a cursor 306, where the geometry processing engine performs the activation as described above. The selected object 304 moves or "floats" with the cursor 306 (thus called a floating object) at a particular displacement, rotation and orientation according to predetermined criterion. In the example shown, the floating object 304 maintains zero degree rotation with its origin on the cursor 306.

Once selected, the operator moves a pointing device to move the cursor 306 and the object 304 within the computer screen 300 along any desired path 308, and eventually within proximity of an underlying object 310. The floating object 304 is selected and shown on the computer screen 300 but is not made part of the underlying design file until accepted at a desired location by the operator. The underlying object 310 has already been previously accepted and therefore part of the underlying design file. Throughout this disclosure, an underlying object exists in the underlying design file, but a new or selected object to be placed is not made part of the design file until accepted by the operator.

A predetermined and programmed location tolerance, illustrated with a dotted circle 312 but normally not displayed, identifies a minimum perpendicular distance which determines when the object 304 is close enough to the underlying object 310 to establish an association or graphic relationship. When the designated origin point of the object 304 moves to within the location tolerance 312 with respect to the underlying object 310 or with respect to any other object where a graphic relationship is allowed, the cling mode of interaction is invoked whereby the floating object 304 "jumps" onto the underlying graphics object 310 as though it were magnetically attracted. In FIG. 3A, the origin and cursor 306 are positioned at a distance from the underlying object 3 10 greater than the location tolerance 312, so the object 304 remains floating with or otherwise attached to the cursor 306.

Figure 3B:
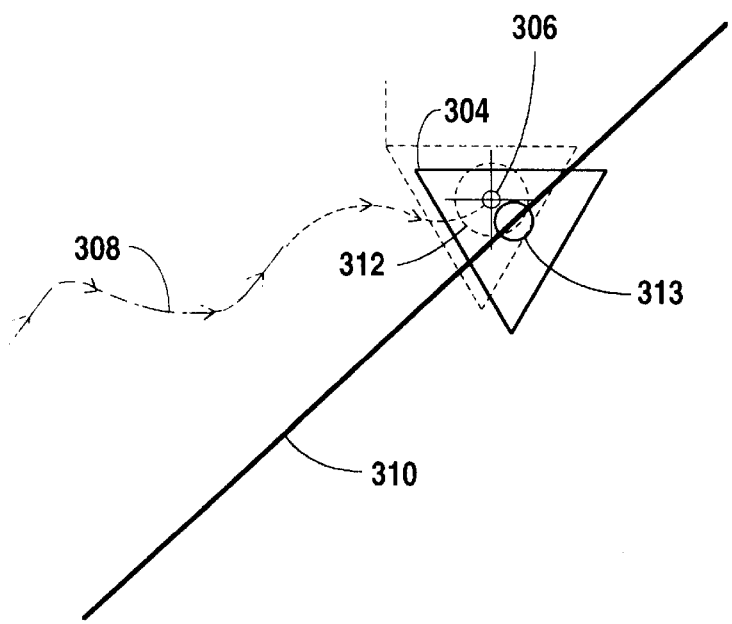
FIG. 3B illustrates an initial cling characteristic of a floating object with an existing, underlying object.

FIG. 3B illustrates the initial cling characteristic of a floating object with an existing, underlying object. In particular, once the object 304 is within the location tolerance of the underlying object 310, the floating object 304 jumps from the cursor 306 to cling to the underlying object 310. In the example shown in FIG. 3B, the jump is the shortest or perpendicular distance where the origin of the object 304 aligns and is coincident with the closest or cling point 313 of the underlying object 310. The cling point 313 is typically displayed on the screen 300 for purposes of visual feedback to the operator, although it may alternatively be transparent or invisible if desired.

Figure 3C:
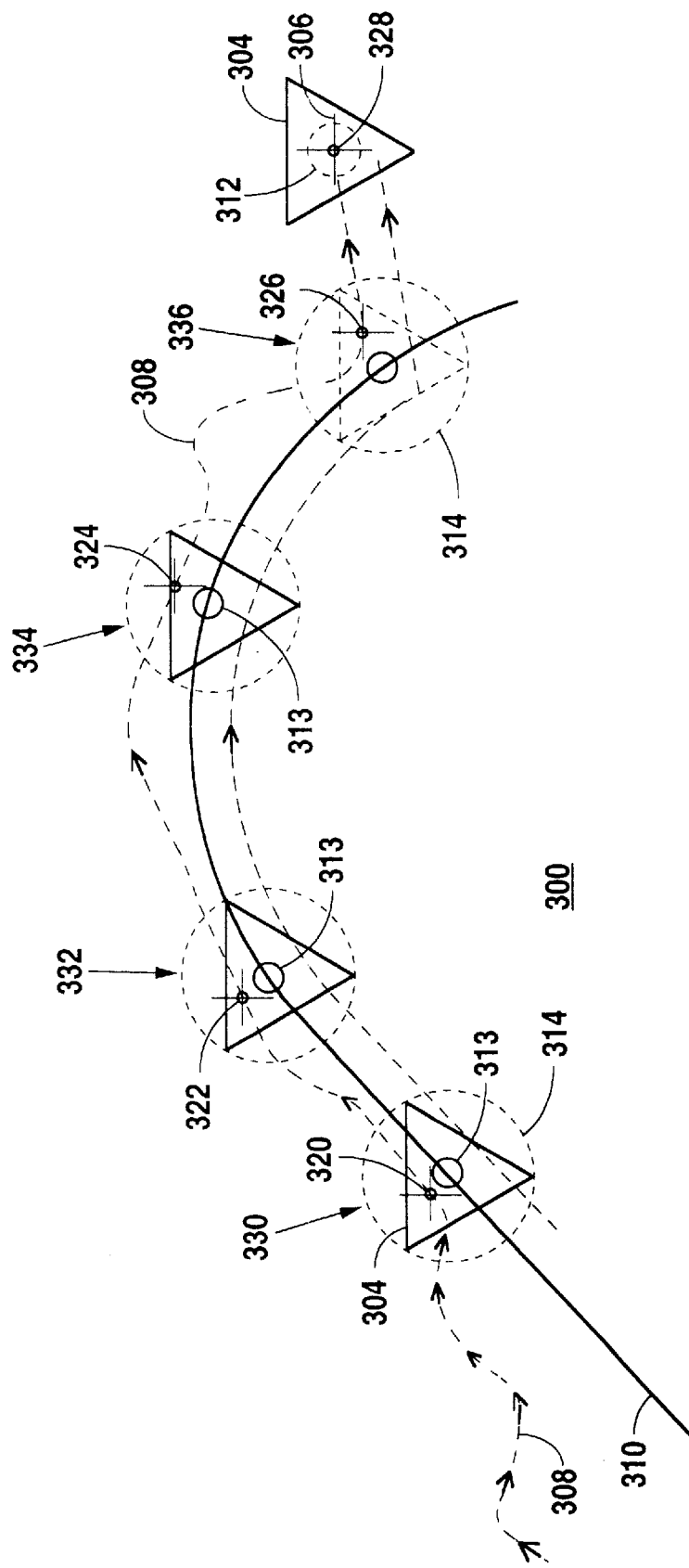
FIG. 3C illustrates a continuing clinging characteristic according to the present invention.

FIG. 3C illustrates how the floating object 304 magnetically clings to the underlying object 310 as the cursor 306 is moved in proximity with the underlying object 310. As the pointing device is moved by the operator, the object 304 follows the extent of the underlying object 310 and, if an offset distance, rotation angle, or other geometric specification has been defined, the object 304 assumes a position with respect to the geometric specifications and the active magnetic cling point 313 on the underlying object 310. In the example shown in FIG. 3C, a programmed rejection tolerance, illustrated as a dotted circle 314 about the origin of the object 304, is defined where the object 304 remains clinging to the underlying object 310 while the cursor 306 is within the rejection tolerance. The rejection tolerance is preferably larger than the location tolerance to achieve a hysteresis effect. It is noted that the location and rejection tolerances are different parameters which are toggled so that only one is active at a time. The location tolerance determines when an object clings to an underlying object and the rejection tolerance determines when a clinging object unclings from the underlying object.

The cursor path 308 and the underlying object 310 are extended to illustrate the cling characteristic. The floating object 304 "slides" in alignment with the underlying object 310 as the cursor 306 traverses the path 308. In particular, when the cursor 306 is at the locations 320, 322, 324 and 326 as shown, the floating object 310 assumes the corresponding positions 330, 332, 334 and 336, respectively. It is noted that the cursor 306 remains within the rejection tolerance defined for the floating object 304 for the positions 330, 332, 334 and 336.

If the operator desires to un-cling from the underlying graphic object 310, operator moves the cursor 306 a distance greater than the rejection tolerance away from the underlying object 310 and the floating object 304 jumps away from the underlying object 310 to the cursor 306 as though it were magnetically repelled. This is shown at a location 328 of the cursor 306, where the floating object once again floats with the cursor 306 as shown at the position 328. If there is an additional specification for the logical relationship between the floating object 304 and the underlying object 310, and if that relationship is not valid for the particular case, the floating object 304 does not cling to and is prevented from floating near the underlying object by an algorithm that displaces the floating object's position with respect to the on-screen pointing device. An additional warning such as an auditory beep or visual cue such as a sudden red color change in the floating object 304 is issued by the computer.

Figure 3D:
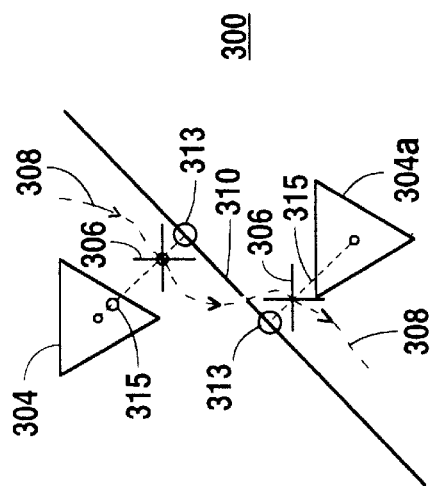
FIGS. 3D–3F illustrate possible behaviors that can be applied to a floating object while it is clinging to an underlying object.
Figure 3F:
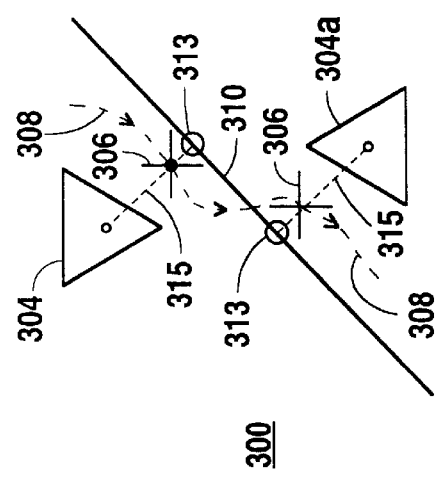
Figure 3E:
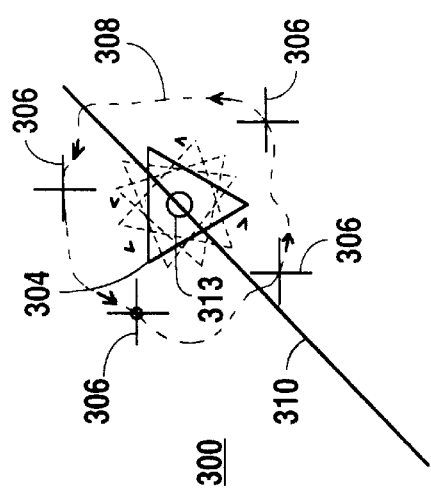

FIGS. 3D–3F illustrate possible behaviors that can be applied to the floating object 304 while it is clinging to an underlying object 310. These behaviors are predefined according to geometric constraints for a given object. FIG. 3D illustrates that the object 304 may be spun about an initial cling point 313 by manipulating the cursor 306 around the cling point 313, in contrast with FIG. 3C showing the object 304 predefined to maintain a zero degree orientation regardless of its location. Further, the object 304 does not slide but sticks to the initial cling point and rotates according to movements of the cursor 306. FIG. 3E shows the object 304 positioned at a specified perpendicular offset 315 from cling point 313 in the direction of the cursor 306 and maintaining a zero degree orientation. Note that the floating object 304 jumps to the opposite side of the underlying object 310, as shown as 304A, when the cursor 306 traverses from one side to the other of the underlying object 310. FIG. 3F shows the object 304 (304A) at a 180 degree rotation of the underlying object 310 at a specified perpendicular offset 315 from cling point 313 in the direction of the cursor 306, again on opposite sides of the underlying object 310. Other variations are possible, of course, including multiple instances of the floating object, such as a mirror image of the floating object at a specified perpendicular offset from cling point in the direction of the cursor 306, etc.

FIGS. 4A–4D illustrate yet further examples of the cling characteristic using a system according to the present invention. In each case, a cursor 406 with a floating object 404 is moved within a screen 400 along a path 408 relative to an underlying object 410 already placed on the screen 400. The object 404 is kept a predefined distance from the underlying object 410 relative to a sliding cling point, which slides along the underlying object 410 following the cursor 406. The floating object 404 flops to the other side of the underlying object 410, as indicated at 404A, when the cursor 406 crosses over the underlying object 410 in a similar manner as described previously. It is noted that only one object is shown at any given time in the example of FIGS. 4A–4D, where the designations 404 and 404A illustrate orientation of the same object on opposite sides of the underlying graphic object 410.

Other graphic relationships define the orientation and rotation of the floating object 404 based on the position of the cursor 406. In FIG. 4A, the object 404 is mirrored about the underlying object 410 when flopped to 404A. In FIG. 4B, the object 404 is mirrored about a perpendicular 415 when flopped to 404A. In FIG. 4C, the object 404 is mirrored with respect to both the perpendicular 415 and the underlying object 410 to 404A. In FIG. 4D, the object 404 maintains a parallel relationship to 404A.

FIG. 5 illustrates how TEXT is handled in context with other graphic objects. Once the related symbolic object 510 has been drawn on a screen 500, a TEXT annotation floats with a cursor 506 while obeying constraints for placement of the TEXT. The TEXT is made to align to the underlying graphic object 510 using specified offsets, parallels and tangencies. In the example shown, the TEXT begins with an initial location tolerance, identified by dashed circle 512 and a larger rejection tolerance as illustrated by a dashed circle 514, both with respect to an origin of the TEXT. At first, the TEXT floats with the cursor 506 until the cursor 506 is within the location tolerance, at which time the TEXT jumps to align parallel and at a perpendicular tangent with respect to the underlying graphic object 510, but separated by a predefined offset 515. While the cursor 506 is moved along a path 508, within the rejection tolerance, the TEXT aligns tangentially with the underlying object 510 at the defined offset 515. This is illustrated at cursor positions 520, 522, 524 and 526. When the cursor 506 crosses over the underlying object 510 at point 530, the TEXT preferably jumps to the opposite side, but maintains an orientation to allow the TEXT to be read in normal upwards fashion. A dotted line 532 illustrates the path that the TEXT follows. Furthermore, a characteristic is defined where the TEXT automatically re-aligns itself at 180 degree increments, which occurs between positions 524 and 526, to maintain upward reading orientation. When the cursor 506 is moved outside the rejection tolerance, the TEXT jumps back to float with the cursor 506 at an origin, and the location tolerance is re-established.

Figure 6A:
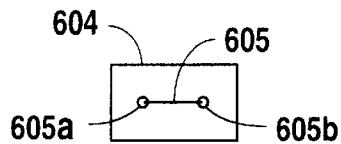
FIGS. 6A–6D, 7A–7D, 8A–8E and 9A–9E illustrate various examples of objects including alignment vectors for aligning the graphic objects and modifying underlying objects.

FIGS. 6A–6D, 7A–7D, 8A–8D and 9A–9D illustrate various examples of alignment vectors for inserting and cutting graphic objects. FIG. 6A illustrates an object 604 with a single alignment vector 605 having two points, an origin point 605a for geometry calculations and an alignment point 605b for establishing orientation and direction of the alignment vector 605 and the object 604. Although the object 604 is shown as a simple rectangle, it can be any object following particular alignment rules, such as pipes, electrical components, etc.

Figure 6B:
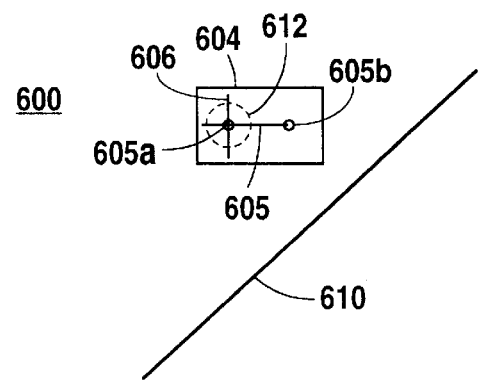
Figure 6C:
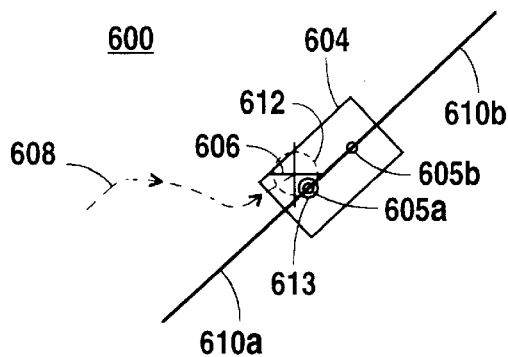

FIG. 6B shows a screen 600 with an underlying object 610 and a floating object 604 floating with a cursor 606 for insertion, where the underlying object 610 is illustrated as a single line segment. The object 604 includes an alignment vector 605 where the cursor 606 preferably aligns with the origin point 605a. A location tolerance is predefined and indicated by a circular outline 612 around the cursor 606. The object 604 is moved with the cursor 606 along a path 608 and brought within the location tolerance of the underlying object 610, where the object 604 snaps to and aligns with the underlying object 610, as shown in FIG. 6C. In particular, the origin point 605a jumps to a cling point 613 and the object 604 and alignment vector 605 rotate to align so that the second point 605b lies on top of the underlying object 610. The object 604 now clings and slides along the underlying object 610 in a similar manner described previously, where a rejection tolerance is usually defined for maintaining cling with movement of the cursor 606.

It is noted that the eventual desired result is to "connect" the object 604 to the underlying object 610 at the origin point 605a, thereby affecting the underlying object 610 in the data base as well as graphically, if desired. In the example shown in FIG. 6C, the underlying object 610 is preferably split into two separate line segments 610a, 610b at the origin point 605a of the alignment vector 605. The underlying object 610 is preferably immediately modified during the cling action and dynamically updated as the object 604 is moved along the underlying object 610, where the respective lengths of the line segments 610a, 610b are modified accordingly. Alternatively, the underlying object 610 is not affected until the object 604 is actually accepted at a desired location.

Figure 6D:
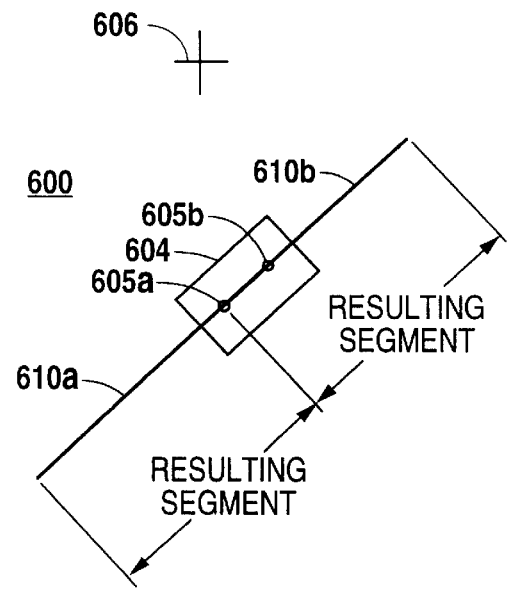

In FIG. 6D, the operator has accepted an appropriate location of the object 604, where the underlying object 610 is split into two separate vectors 610a and 610b at the common origin point 605a. It is appreciated that the operator had to only select the object 604, move the cursor to within a predetermined proximity of an underlying object 610, and the system automatically aligned the object 604 with respect to the underlying object 610 and further modified the underlying object 610 according to predefined rules. Then the operator simply moves the cursor in proximity of the underlying object 610 to select the desired location, and accept the object 604 and the object 604 is added.

Figure 7A:
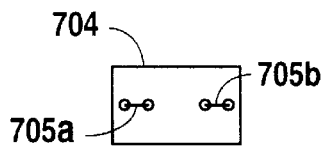
Figure 7B:
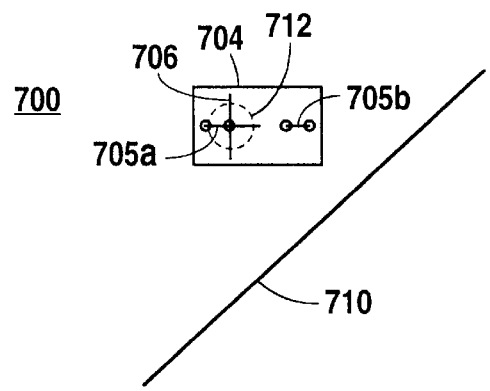
Figure 7C:
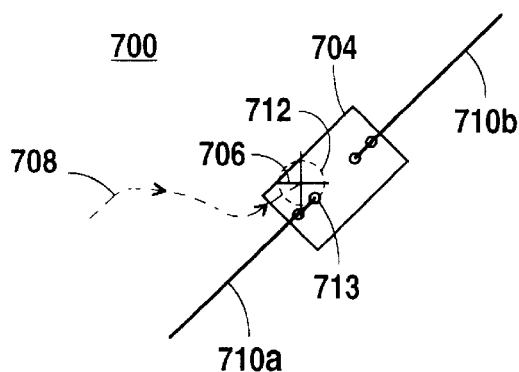

FIG. 7A illustrates an object 704 including a double alignment vector 705 in collinear mode with two spaced vectors 705a and 705b, each including origin points and alignment points for directional purposes in a similar manner as shown in FIG. 6A. The separation between the respective origin points of the alignment vectors 705a and 705b defines a cut length for cutting an underlying object. In FIG. 7B, a screen 700 is shown including an object 704 selected for connection to an underlying graphic object 710, which is another line segment as shown. When the object 704 is moved into proximity with the underlying object 710 as shown in FIG. 7C, the origin point of vector 705a clings to a cling point 713, the object 704 and vectors 705a, 705b rotate to align with the underlying object 710, and the underlying object 710 is divided into two separate line segments 710a, 710b separated by the predefined cut length. Again, the underlying object 710 is either modified or cut immediately or modified after the object 704 is actually accepted. Again, the floating object 704 clings and slides along the underlying object 710 while the cursor 706 is moved within the predefined proximity or rejection tolerance, continually redefining the location of the cut.

Figure 7D:
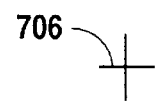

Eventually the operator selects the location of the object 704, and the object 704 is inserted and the underlying object 710 is appropriately divided as shown in FIG. 7D. As a practical example, if a floating object includes specific definitions of collinear vectors, the geometry engine cuts the underlying linear graphic object and connects the resulting linear segments to the collinear vectors. This has the effect of breaking a line and inserting a device that forms part of the line, such as a fuse on a circuit schematic.

Figure 8A:
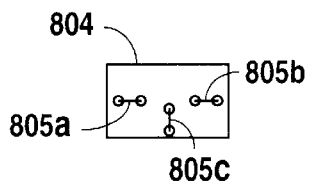

FIG. 8A illustrates an object 804 including double alignment vectors 805a, 805b in collinear mode with an additional orthogonal alignment vector 805c. The collinear vectors 805a, 805b are two spaced vectors, where all three vectors include an origin point and an alignment point for directional purposes as described previously. The orthogonal alignment vector 805c is preferably placed between and orthogonally aligned with the collinear vectors 805a, 805b as shown. The separation between the collinear vectors 805a, 805b defines a cut length.

Figure 8B:
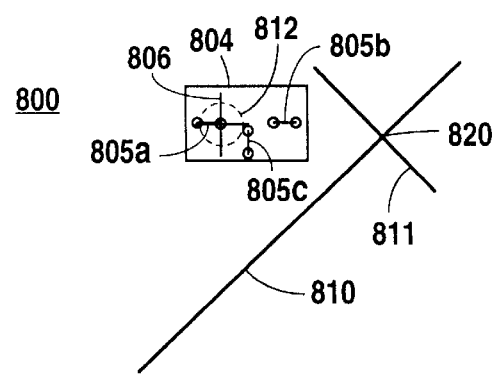

In FIG. 8B, the object 804 with the alignment vectors 805a, 805b and 805c is selected for interaction with underlying graphic objects 810 and 811, where the primary vector 810 orthogonally intersects a secondary vector 811 at a point 820 as shown. is Again, a screen 800 is shown including a cursor 806 for locating the object 804.

Figure 8C:
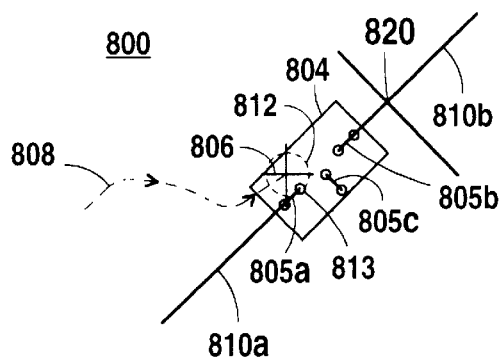

When the object 804 is in proximity of the underlying object 810 as shown in FIG. 8C, the collinear vectors 805a, 805b cling, align and cut the underlying primary vector 810 into two separate vector objects 810a, 810b separated by the predefined cut length in a similar manner as described previously. The origin point of the vector 805a has a location tolerance for jumping and clinging with the primary vector 810. The object 804 clings and slides along the primary vector 810.

Figure 8D:
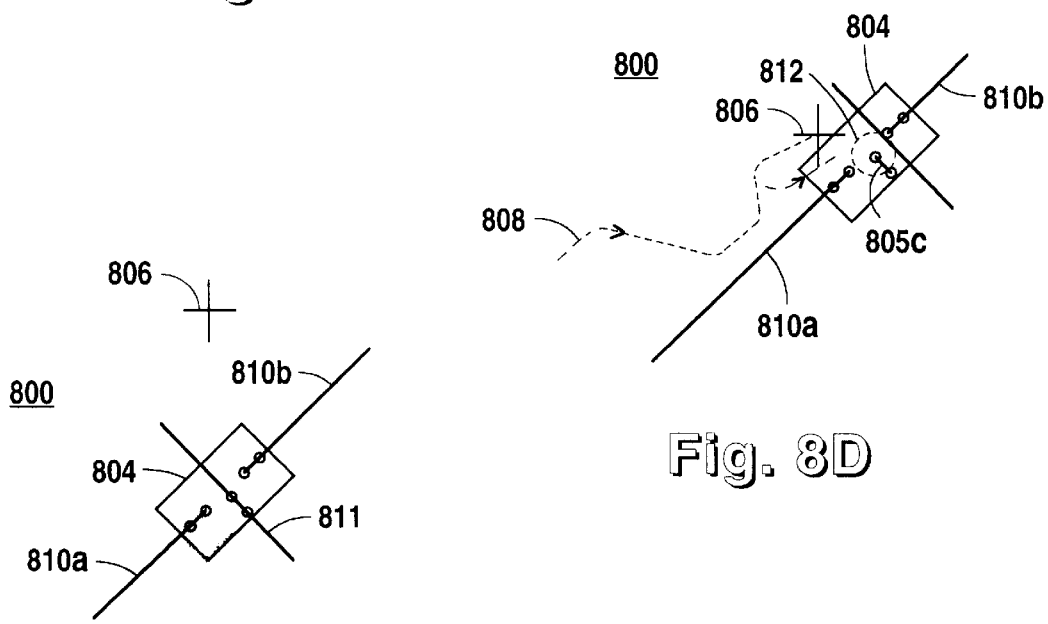

As illustrated in FIG. 8D, the orthogonal alignment vector 805c also has a separate location tolerance defined for its origin for clinging to the secondary vector 811. Thus, when the origin point of the orthogonal alignment vector 805c is within its location tolerance with the secondary vector 811, the object 804 and alignment vectors 805a, 805b and 805c jump so that the origin and alignment points of the vector 805c align with the underlying vector 811. The operator may move the cursor 806 about a rejection tolerance, where the object 804 remains static and aligned with the intersection point 820.

Figure 8E:
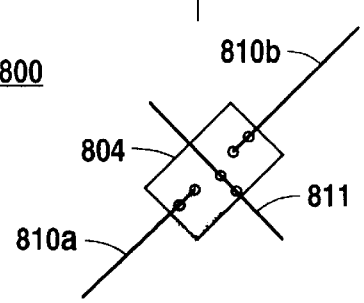
Figure 9A:
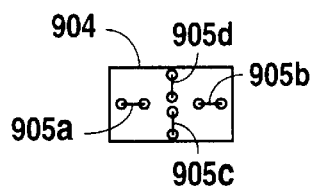
Figure 9B:
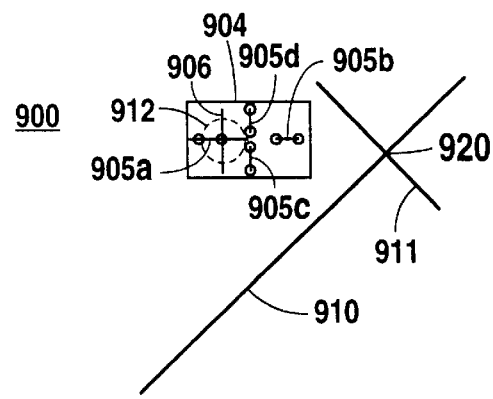
Figure 9C:
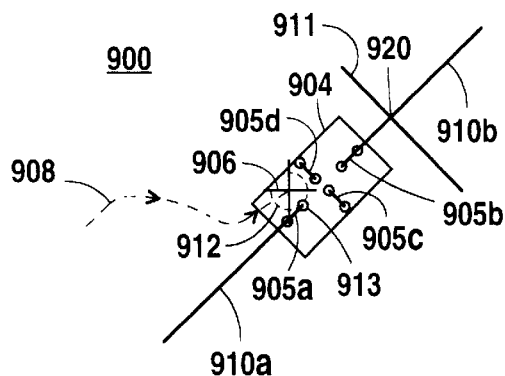
Figure 9D:
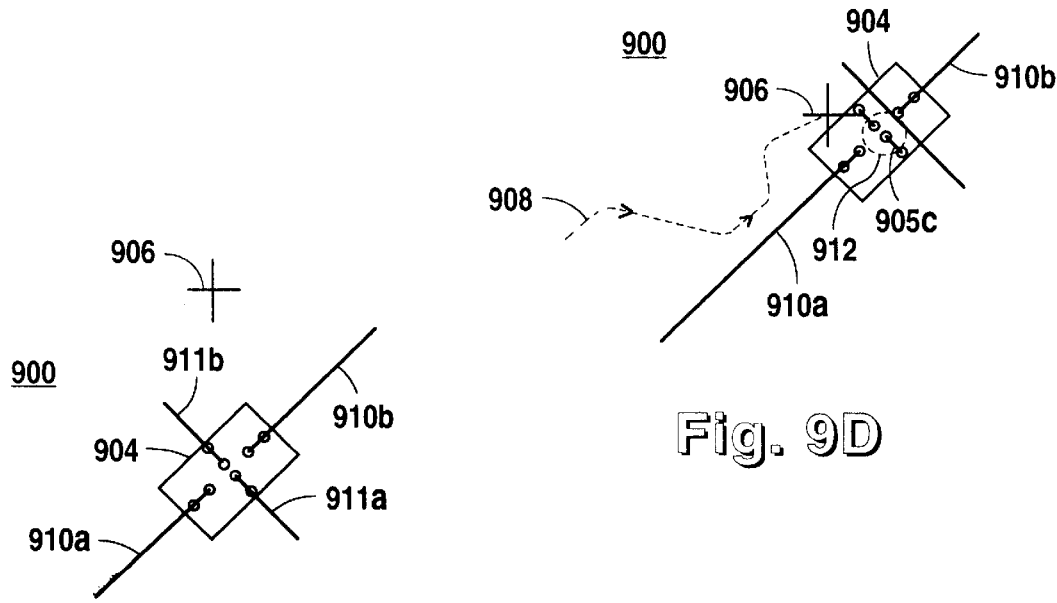
Figure 9E:
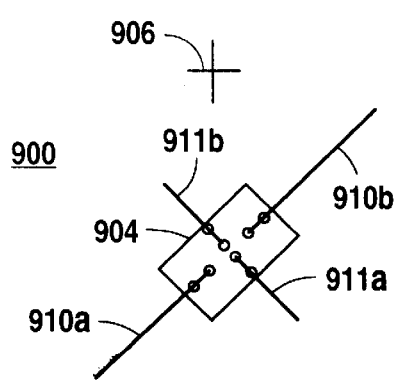

In FIG. 8E, the operator accepts the result, and the underlying primary segment 810 is divided into two collinear line segments 810a, 810b separated by the cut length, where the cut length is divided on either side of the secondary vector 811. In the example shown, the primary vector 810 is divided equally on either side of the secondary vector 811, although unequal divisions and non-orthogonal intersections, e.g. isometric, etc. are just as easily achieved as desired.

FIGS. 9A–9E are similar to FIGS. 8A–8E, except illustrating primary 905a, 905b and secondary 905c, 905d collinear alignment vectors defining two separate cut lengths for the primary 910 and secondary 911 underlying objects, respectively. The primary and secondary vectors 910, 911 are divided into two portions 910a, 910b and 911a, 911b, respectively, divided by respective cut lengths, and the object 904 is aligned and places as desired.

FIGS. 10A and 10B illustrate operation of alignment vectors for aligning an underlying T pipe object 1010 and a selected elbow pipe object 1004 using alignment vectors on a screen 1000. The underlying T pipe object 1004 includes an alignment vector 1005 and the T pipe object 1010 includes an alignment vector 1017, each with an origin point and an alignment point. The operator selects the elbow pipe object 1004 having a predefined location tolerance about the origin point of the vector 1005. The elbow pipe object 1004 floats with the cursor 1006, it is within the location tolerance of the origin point of the alignment vector 1017 of the T pipe object 1010, where the elbow pipe object 1004 is automatically rotated and positioned so that the respective origin points and alignment points of each of the alignment vectors 1005, 1017 overlap. In this manner, the two objects 1004 and 1010 are automatically aligned with each other by the system, and the operator need only accept or reject the proposed relationship. In particular, if the operator intended to connect the objects 1004, 1010 as proposed, the relationship is accepted, and if not, the operator simply moves the elbow pipe object 1004 beyond the rejection tolerance for connection with another object as desired.

It is noted that the particular alignment vectors described herein are for purposes of illustration. Thus, alignment vectors need not be collinear nor orthogonal but may be aligned at any desired orientation and angle.

FIG. 11 illustrates the present invention used to implement objects including clip regions for partial deletion of underlying graphic objects in a design. A palette 1102 is provided on a screen 1100, where the palette includes three objects 1104, 1106 and 1108, each having corresponding clip patterns 1104a, 1106a, and 1108a, respectively. Also provided on the screen 1100 is a set of underlying object symbol patterns, including a pattern of splines 1110, a horizontal line pattern 1112 and a vertical line pattern 1114 intersecting one another as shown. The operator selects one of the objects 1104, 1106 and 1108 from the palette 1102, and the selected object floats with the cursor as the cursor is moved across the screen 1100 by the operator. As the selected object coincides with or covers the patterns 1110, 1112, or 1114, a portion of all or certain ones of the underlying patterns 1110, 1112 and 1114 that are coincident with the corresponding clip region of the selected object is deleted.

In particular, the clip pattern 1104a deletes the coincident portion of the pattern of splines 1110, but otherwise does not affect the horizontal or vertical pattern of lines 1112, 1114. The clip pattern 1106a deletes the coincident portion of all of the patterns 1110, 1112 and 1114. The clip pattern 1108a deletes the coincident portion of the horizontal and vertical line patterns 1112, 1114, but does not affect the underlying pattern of splines 1110. This partial deletion is contrasted with simple masking capability, where the graphic portion of the object is obscured but the object "remains" in the graphic file. Although the present invention may be used for partial masking, partial deletion involves actually deleting the coincident portion of the underlying graphic objects in a selective mode.

It is noted that the partial deletion may be performed interactively as the selected and floating object is moved across the screen 1100. However, this is computationally intensive and may cause a computer system to slow down considerably. Thus, the object is usually drawn and the underlying deletions are preferably performed upon acceptance of object at a desired location.

An example of objects including clip patterns to partially delete any underlying graphic object elements is TEXT, where it is desired to create "white space" for TEXT annotation. The objects to be deleted are contained in a specification for that type of annotation. In FIG. 5, for example, if the TEXT overlaps certain underlying objects, a portion of the object coincident with the TEXT is deleted. Also, if the definition of the floating object includes a closed shape drawn with specific graphic parameters, the geometry object engine causes the CAD system to partially delete all specified graphic objects that fall within the defined region. This has the effect of "cleaning up" graphic elements that would otherwise appear to be visually merged with the floating object.

Figures 13A, 13B, 13C:
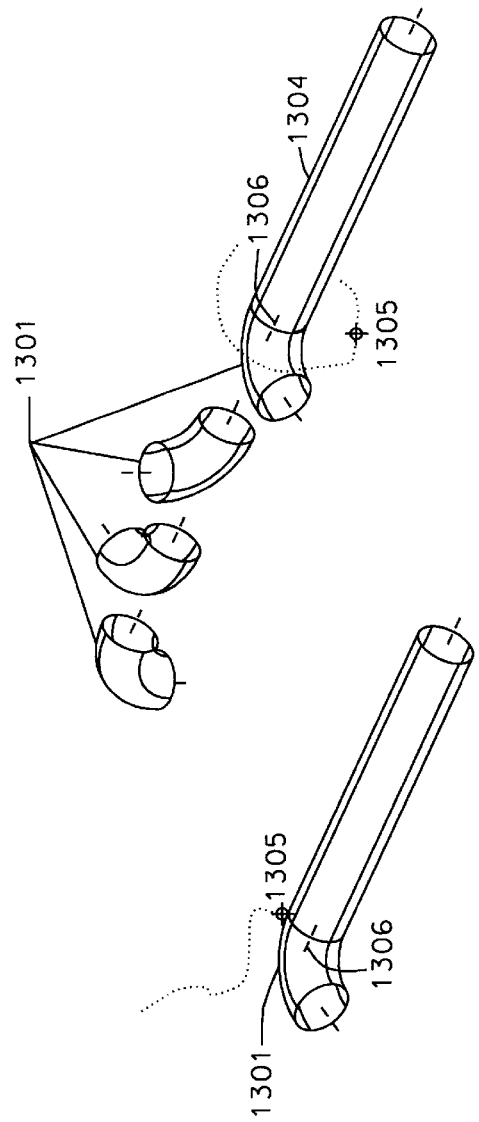
FIGS. 13A–13C are three dimensional (3D) graphic diagrams illustrating assembly of two pipe objects.

FIGS. 13A–13C are three dimensional (3D) graphic diagrams illustrating assembly of a 3D elbow pipe object 1301 with an underlying 3D straight pipe object 1304. The operator selects a 3D object, such as the elbow pipe object 1301, using the pointing device 1206, which causes the geometry processing engine to activate the selected object. The elbow pipe object 1301 moves in conjunction with a cursor 1305, which in turn is moved by the operator using the pointing device 1206. As shown in FIG. 13A, the elbow pipe object 1301 includes a geometric graphic constraint element 1302, which is similar to the alignment vector 1005 of the elbow pipe object 1004, and which is part of the definition of the elbow pipe object 1301. The elbow pipe object 1301 is moved relative to the cursor 1305 to within proximity of an existing graphic constraint element 1303 of the straight pipe object 1304. Again, the graphic constraint element 1303 is part of the definition of the straight pipe object 1304.

As shown in FIG. 13B, when the cursor 1305 is moved to occlude a portion of the graphic constraint element 1303 of the straight pipe object 1304, the cling mode of interaction is invoked by the geometry processing engine so that the elbow pipe object 1301 jumps to the straight pipe object 1304 as though it were magnetically attracted. The new position is determined by the geometry processing engine based on the definitions in the graphic constraint element 1303 and position of the cursor 1305, which cursor position is defined by the position of the pointing device 1206 as manipulated by the operator. It is noted that a designated magnetic origin point of a graphic constraint element, such as the graphic constraint element 1302 of the elbow pipe object 1301, is typically defined to be coincident with the cursor 1305 when moved with the cursor 1305 in float mode. However, the locations of the cursor and a graphic constraint elements during float mode may be defined in any manner as desired. The magnetic origin or cling point jumps away from the cursor and towards the underlying graphic object during cling mode as previously described.

As shown in FIG. 13C, as the cursor 1305 is moved around the end of the straight pipe object 1304 by the operator, the geometry processing engine determines and rotates the 3D elbow pipe object 1301 about a cling vector 1306, which is defined as a collinear vector with the graphic constraint elements 1302, 1303 during cling mode. The graphic constraint elements 1302, 1303 are defined to enable the elbow pipe object 1301 to rotate about the cling vector 1306 at any angle, or to rotate only to one or more predetermined angle orientations. For example, as shown in FIG. 13C, four predetermined orientations for the elbow pipe object 1301 with respect to the straight pipe object 1304 are shown as a result of a separate rotational constraint of 90 degrees. In this manner, the geometric relationship between the elbow pipe object 1301 and the straight pipe object 1304 is defined based on the graphic constraint elements 1302, 1303 during cling mode and the position of the pointing device 1206. The geometry processing engine dynamically and interactively updates the 3D display according to the defined geometric relationship.

It is noted that if there is an additional specification for the logical relationship between the new object and the underlying graphic object, and if that relationship is not valid for the particular case, then the new object does not cling to the underlying object, and is prevented from being near the underlying object by displacing the new object's position with respect to the cursor. An additional notice to the user such as an auditory beep or visual cue such as a sudden red color change in the new 3D object may be issued by the computer.

Figure 14B:
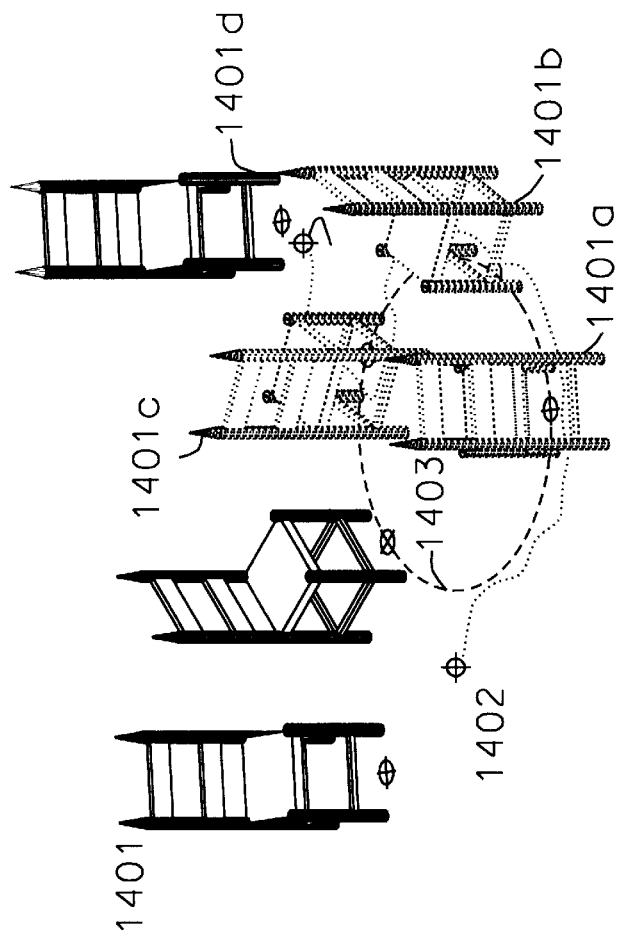
FIG. 14B is a 3D graphic diagram illustrating the behavior of the selected 3D object of FIG. 14A with the underlying graphic constraint element according to the predefined geometric constraint element constraints when a selected 3D object occludes the graphic constraint element.
Figure 14A:
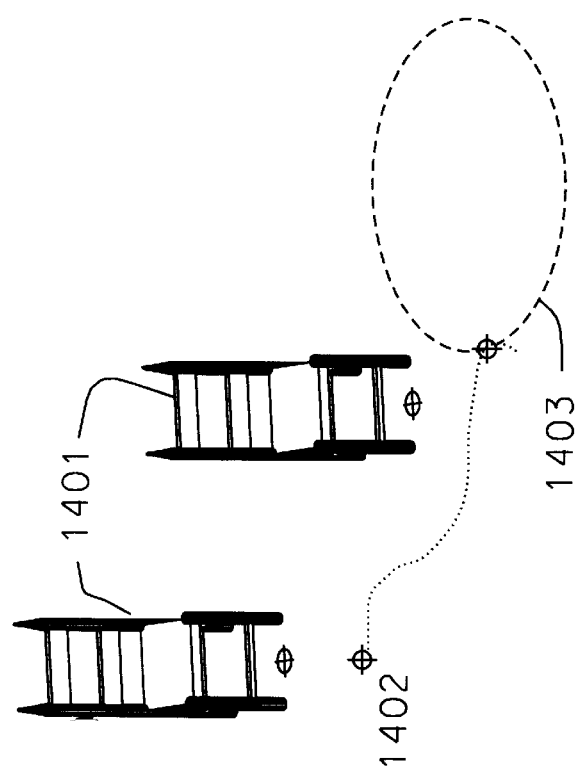
FIG. 14A is a 3D graphic diagram illustrating a selected 3D object being moved with a graphic pointing symbol towards an underlying graphic constraint element with predefined geometric constraints.

FIG. 14A is a 3D graphic diagram illustrating a selected 3D chair object 1401 being moved with a cursor 1402 towards an underlying circular graphic constraint element 1403 having predefined geometric constraints. As before, the operator selects the 3D chair object 1401 and moves it freely through 3D model space in conjunction with the motion of the cursor 1402, which is moved according to position and movement of the pointing device 1206. The position and orientation of the 3D chair object 1401 is defined only with respect to the cursor 1402 while floating in 3D space and before occluding any underlying graphic objects.

The circular graphic constraint element 1403 is shown in isometric projection, which is predefined as a graphic constraint element by it's color, pattern, weight, layer, class or other graphic parameters. The circular graphic constraint element 1403 is defined alone and is not necessarily part of any underlying graphic object in this case. However, the circular graphic constraint element 1403 is used to represent a real or physical object, such as, for example, a surface for placement of certain 3D objects, such as the 3D chair object 1401.

When the cursor 1402, coincident with a designated magnetic origin point, or cling point, of the selected chair object 1401, is moved to occlude a portion of the circular graphic constraint element 1403 as shown in FIG. 14B, the chair object 1401 is repositioned and displayed by the geometry processing engine into an appropriate position and geometric relationship with the underlying circular graphic constraint element 1403. In particular, the chair object 1401 jumps onto the underlying circular graphic constraint element 1403 as though it were magnetically attracted, and clings to the circular graphic constraint element 1403 while the cursor 1402 is moved in proximity thereto. Thus, as the cursor 1402 is moved by the operator, the cling point of the chair object 1401 follows the extent of the circle defined by the circular graphic constraint element 1403 according to particular geometric specifications.

If an offset distance, rotation angle, or other geometric specification has been defined, the chair object 1401 is oriented with respect to the geometric specifications and the active cling point. For example, if the circular graphic constraint element 1403 represents a floor surface, the chair object 1401 is oriented to stand on the floor.

FIG. 14B illustrates various positions and orientations that result as the cursor 1402 is moved about the extent of the circular graphic constraint element 1403. As the chair object 1401 is moved by moving the cursor 1402 outside the circular graphic constraint element 1403, it is manipulated into a tangential and perpendicular position with respect to the cling point and the circular graphic constraint element 1403. Although orientation modifications shown occur with respect to the vertical axis, any 3D vector could be employed as an axis of rotation.

The geometric constraint may be defined to keep the chair object 1401 outside the circle of the circular graphic constraint element 1403 as shown at positions 1401a and 1401b. Alternatively, the geometric constraint may be defined in such a manner so that if the cursor 1402 is moved to a position within the circular graphic constraint element 1403, the chair object 1401 assumes an orientation of 180 degrees rotation from the prior orientation, as shown at position 1401c.

Position 1401d illustrates how the operator causes the 3D object to un-cling from the underlying graphic object. In particular, the cursor 1402 is moved by the operator a specified distance away from the circular graphic constraint element 1403, the chair object 1401 is displayed to jump away from the underlying circular graphic constraint element 1403 and back to the cursor 1402 as though it were magnetically repelled, and it resumes its float behavior.

Figure 15B:
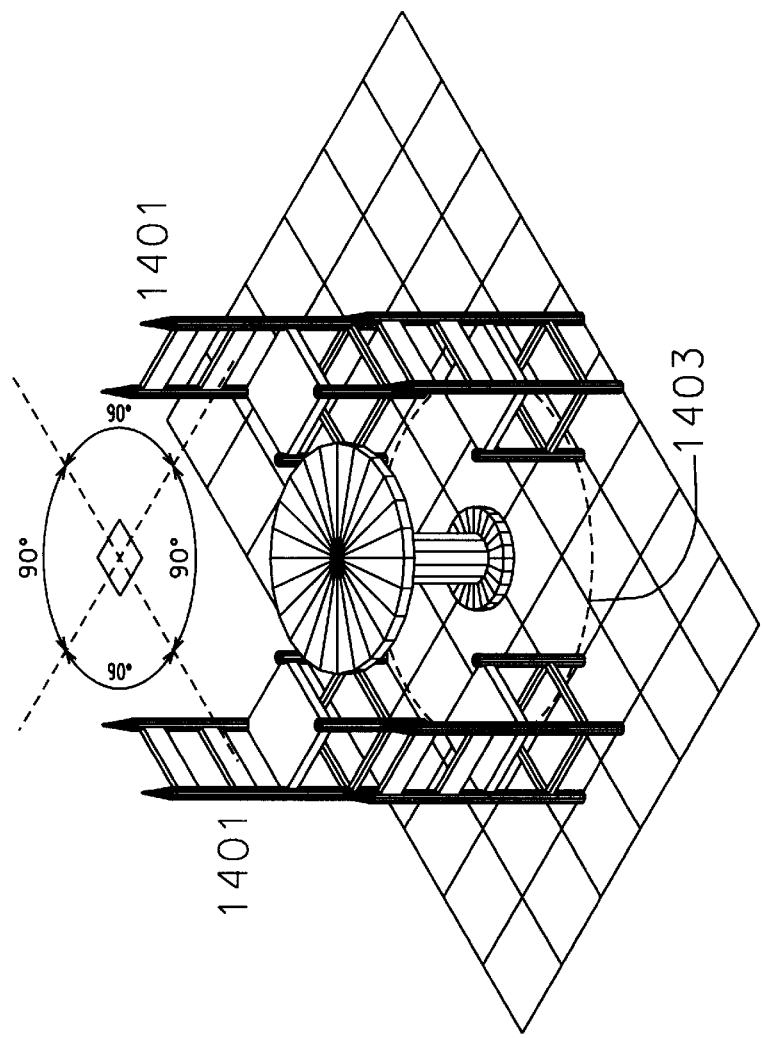
FIG. 15B is a 3D graphic diagram illustrating a 3D design after placing selected 3D objects according to the interactive object placement constraints.
Figure 15A:
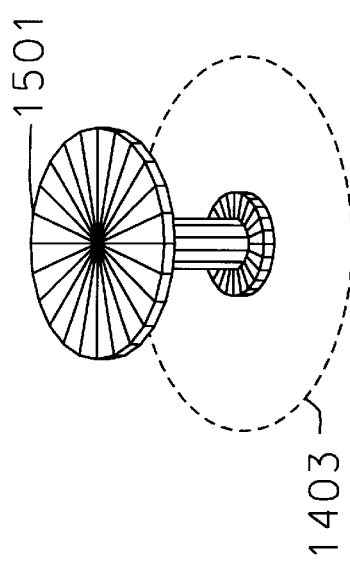
FIG. 15A is a 3D graphic diagram illustrating a graphic assembly constraint element that is combined with a 3D object in order to define interactive object placement constraints.

FIG. 15A is a 3D graphic diagram illustrating a geometric graphic constraint element, such as the circular graphic constraint element 1403, that is combined with a 3D object, such as a table object 1501, in order to define interactive object placement constraints. Geometric graphic constraint elements are usually defined or calculated according to an interesting or important aspect of a graphic object. The graphic constraint elements are either interactively created and automatically calculated based on a primary constraint of a graphic object, or are defined as part of the definition of the object. For example, the circular graphic constraint element 1403 shown in FIG. 15A is either calculated based on other constraints of the table object 1501, or is defined as part of the graphic definition of the circular table object 1501 itself. The table object 1501 is circular and shown as centered within, and concentric with, the circular graphic constraint element 1403, where the circular graphic constraint element 1403 represents both the outline around the table object 1501, and the planar floor surface upon which the table object 1501 is placed.

In this case, one or more chair objects 1401 are placed around the table object 1501 to rest on the planar floor surface and oriented to face the table object 1501. As before, each chair object 1401 is selected and placed by the operator using the pointing device 1206, where the geometry processing engine interactively and dynamically updates the display and geometric relationships based on the predetermined geometric constraints and position of the cursor as determined from position of the pointing device 1206. The geometric constraints of the graphic constraint element 1403 are defined as desired, such as allowing the chair objects 1401 to be placed at any angle about the table object 1501, or may be defined to allow the chair object 1401 to be placed only at particular angles. For example, FIG. 15B is a 3D design illustrating a geometric constraint where the table objects 1401 are allowed only at 90 degree displacements from each other around the table object 1501. In all cases, however, each chair object is automatically placed to properly rest on the planar floor surface as defined by the graphic constraint element 1403.

FIG. 16A is a 3D graphic diagram illustrating placement of 3D furniture objects with respect to an underlying 3D object to create a 3D design 1600. In particular, a first graphic constraint element 1601 is defined about the edge of the table top of a 3D table object 1602. A second graphic constraint element 1603 is defined having the same shape as the first graphic constraint element 1601, but located at an offset below the edge of the table top of the 3D table object 1602 to represent a floor surface upon which the table object 1602 is placed. Both the first and second graphic constraint elements 1601, 1603 are made part of the definition of the table object 1601. The geometry processing engine uses the first and second graphic constraint elements 1601, 1603 to place and display objects.

As shown, a 3D chair object 1610 is placed and displayed around the table object 1602 by the geometry processing engine using the second graphic constraint element 1603 and position of the pointing device 1206, to thereby place the chair object 1610 in an appropriate geometric relationship with the table object 1602 in a similar manner as described above. In this manner, when the chair object 1610 occludes the graphic constraint element 1603, the chair object 1610 is displayed to jump to a position on the floor and oriented to face the table object 1601. As the pointing object is moved, the display is interactively updated to display the chair object 1610 correspondingly moving around the table object 1602. Also, a lamp object 1612 is placed by selecting and moving it to occlude the first graphic constraint element 1601, where the lamp object 1612 is positioned and displayed to properly rest on the top surface of the table object 1602. In this case, the geometric constraints for the first graphic constraint element 1601 are defined such that while the lamp object 1612 is within the outline of the first graphic constraint element 1601, the lamp object 1612 is positioned and displayed on the table surface. In this manner, the operator places the lamp object 1612 at any desired position on the top surface of the table object 1602 simply by moving the pointing device 1206. The geometry processing engine detects the position of the pointing device 1206 and performs the necessary calculations based on the graphic constraints for positioning and displaying the lamp object 1612. Additional 3D objects are placed in this manner to continuously create and update a 3D design.

Figure 16B:
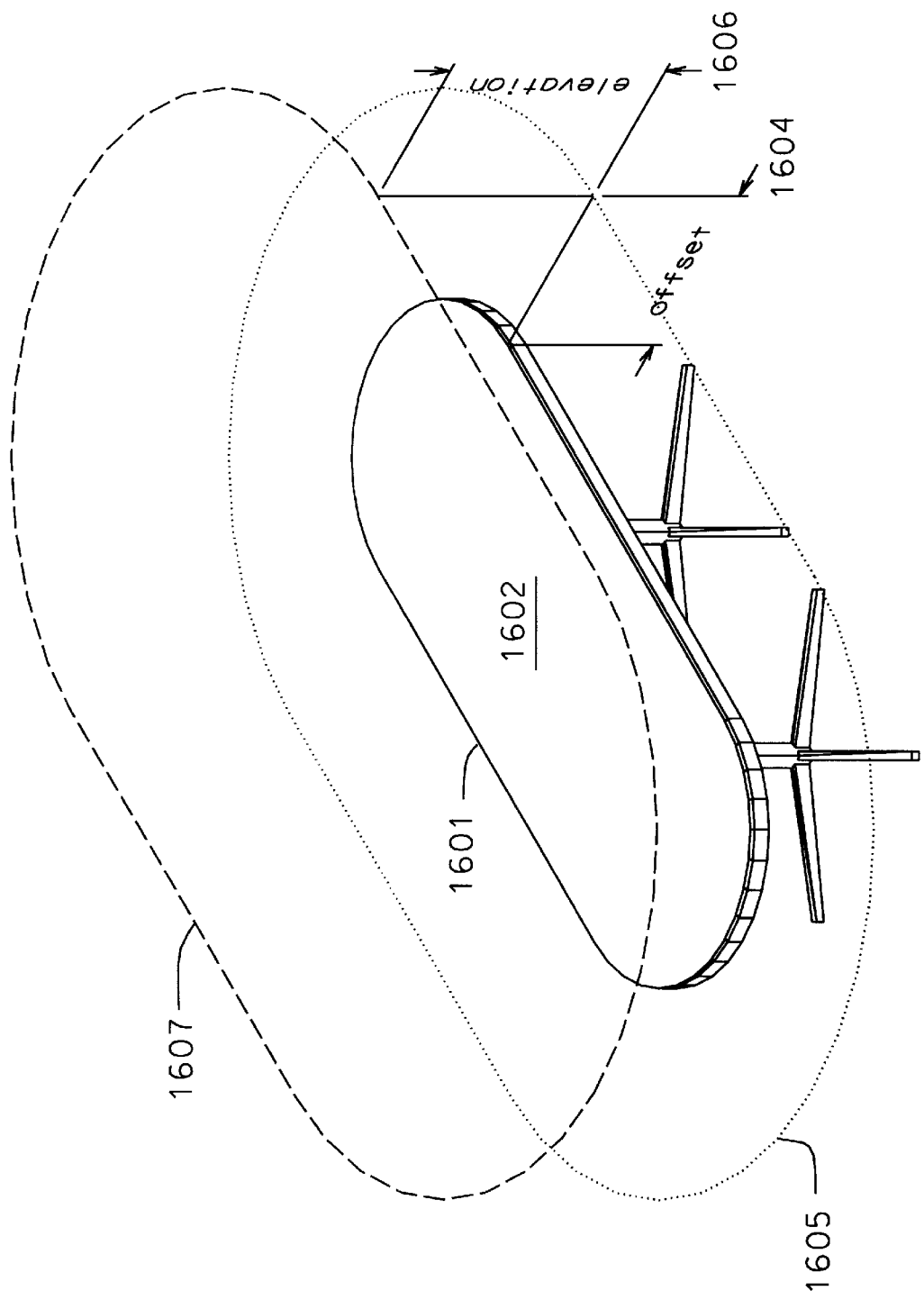
FIG. 16B is a 3D graphic diagram illustrating derivation of additional graphic constraint elements from a primary graphic constraint element for a 3D furniture object.

FIG. 16B is a 3D graphic diagram illustrating the derivation of additional constraint geometry elements from the first graphic constraint element for a 3D furniture object. In particular, a third graphic constraint element 1605 is defined using a fixed offset distance 1604 from each point of the first graphic constraint element 1601 in the horizontal plane, where the third graphic constraint element 1605 is coplanar with the first graphic constraint element 1601. The third graphic constraint element 1605 is either mathematically defined and dynamically updated based on first graphic constraint element 1601, or is made part of the definition of the 3D table object 1602. A fourth graphic constraint element 1607 is also defined using a fixed elevation distance 1606 above the second graphic constraint element 1604, where the fourth graphic constraint element 1607 is in a second plane parallel with the second graphic constraint element 1604. Again, the fourth graphic constraint element 1607 is either mathematically calculated based on other graphic constraints of the 3D table object 1602 or made part of the definition of the table object 1602.

The first, second, third and fourth graphic constraint elements 1601, 1603, 1605 and 1607 are shown as planar elements. However, geometric constraint elements may be defined using linear, planar, 3D, etc. graphic elements as desired.

Figure 17:
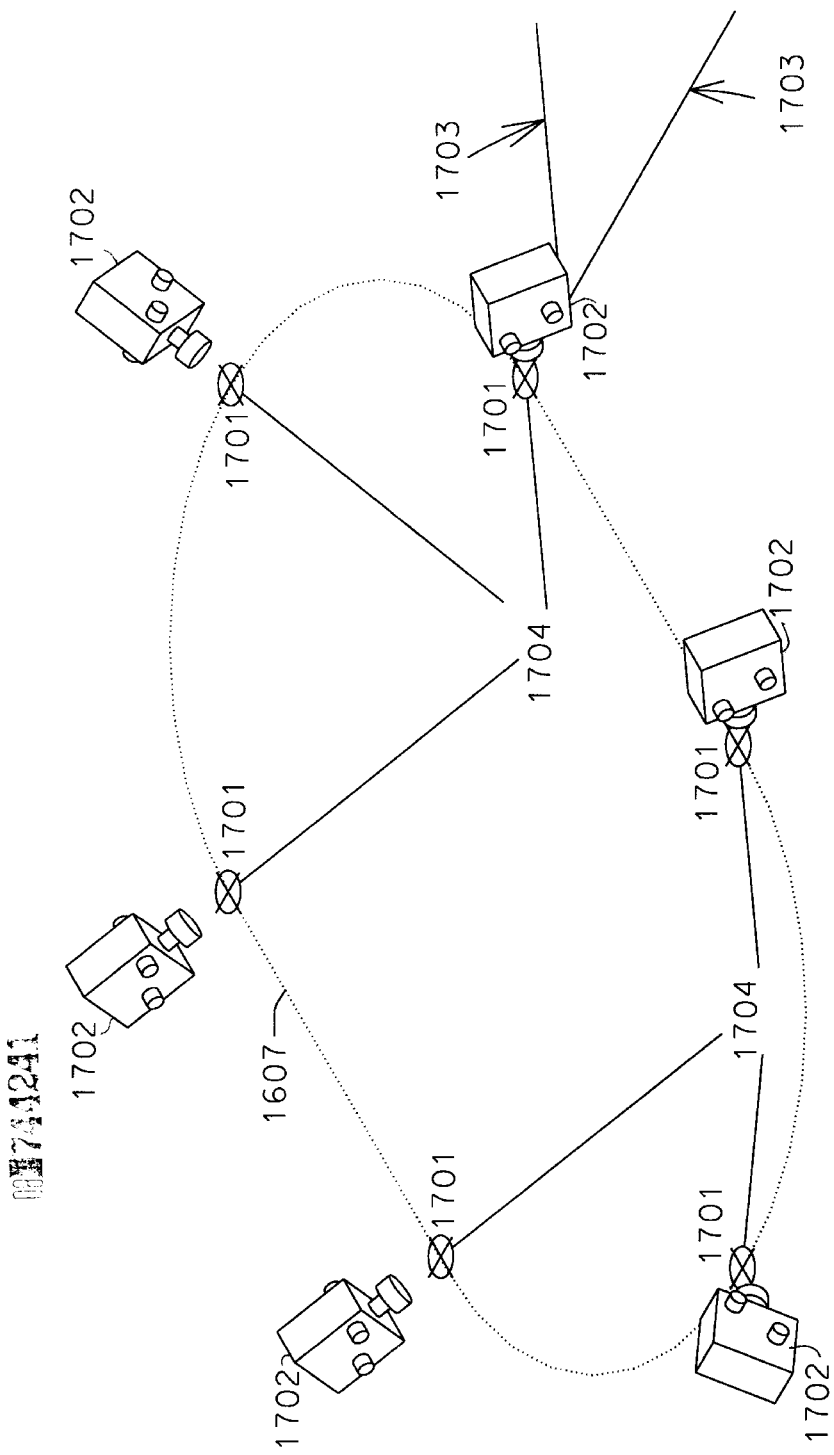
FIG. 17 is a 3D graphic diagram illustrating how 3D visualization is interactively controlled based upon perspective points derived from an additional graphic constraint element derived in FIG. 16.

FIG. 17 is a 3D graphic diagram illustrating how 3D visualization is interactively controlled based upon perspective points derived from the fourth graphic constraint element 1607 of the 3D table object 1602 of FIG. 16. In particular, one or more logical camera objects 1702 are selected and placed along the length of the graphic constraint element 1607 in a similar interactive manner as described previously. The logical camera object 1702 is moved with a cursor until a defined cling point clings to the graphic constraint element 1607, where each cling point becomes a view perspective tangent point 1701.

While clinging to the graphic constraint element 1607, each logical camera object 1702 is orthogonally aligned with the graphic constraint element 1607. As shown, each logical camera object 1702 represents its associated view perspective tangent points 1701, where each logical camera object 1702 initially points inwards with respect towards the graphic constraint element 1607. In the example shown, an adjustable angle value 1703 is applied to rotate each logical camera object 1702 parallel to the graphic constraint element 1607 in order to orient the view onto a region of interest 1704. Each logical camera object 1702 may be aligned individually, or any two or more of the logical camera objects 1702 may be selected and aligned simultaneously. The region of interest 1704 is preferably associated with the 3D table object 1602, so that each logical camera object 1702 is aligned to point towards the 3D table object 1602.

Figure 18:
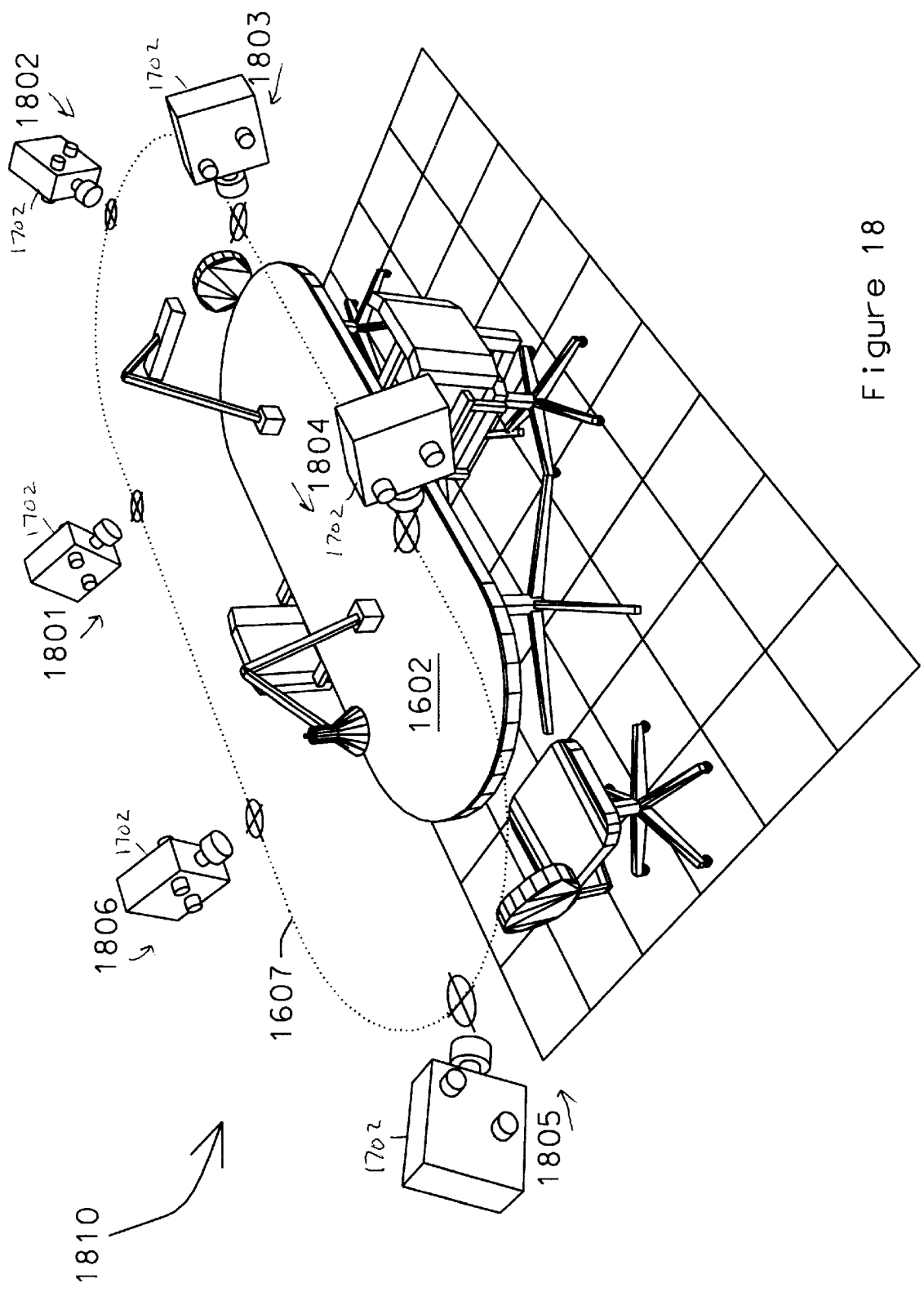
FIG. 18 is a 3D graphic diagram illustrating a series of constrained view perspective points as applied to the visualization of an inferred assembly of 3D furniture objects forming a 3D design.
Figure 19A:
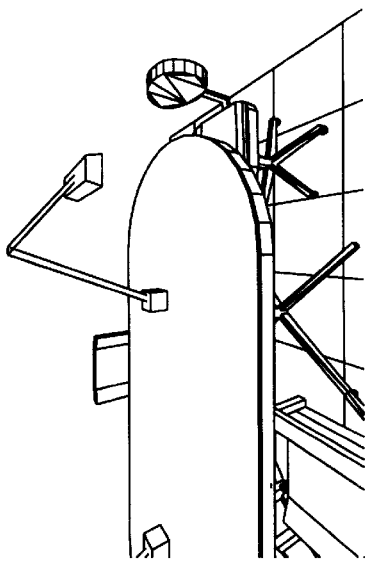
FIGS. 19A–19F are 3D graphic diagrams showing the view from each of the constrained view perspective points of the 3D design of FIG. 18.
Figure 19B:
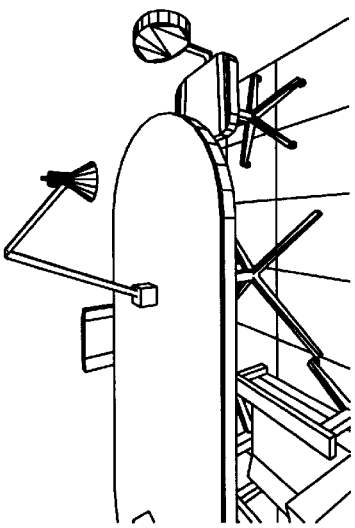
Figure 19C:
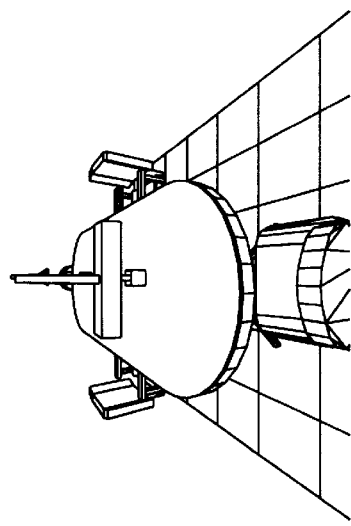
Figure 19D:
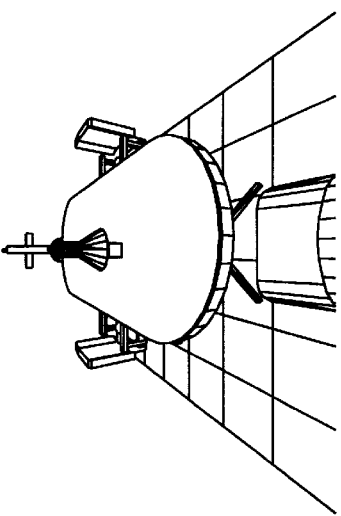
Figure 19E:
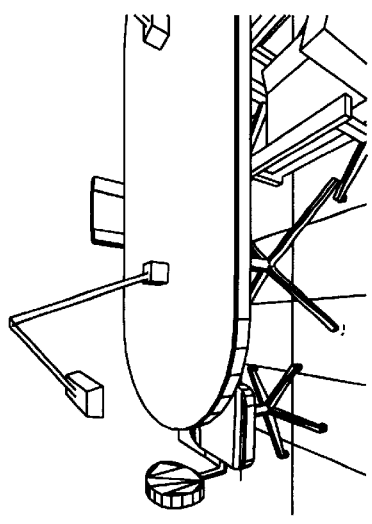
Figure 19F:
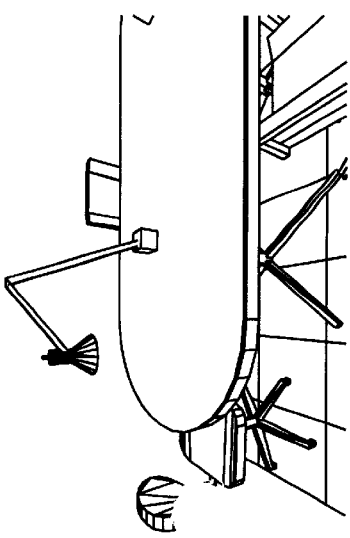

FIG. 18 is a 3D graphic diagram illustrating a series of logical camera object positions 1801, 1802, 1803, 1804, 1805 and 1806 of a camera object 1702, each position representing a constrained view perspective point as applied to the visualization of an inferred assembly of 3D furniture objects including the 3D table object 1602. Each of the 3D furniture objects were placed about the table object 1602 forming an inferred assembly 3D design 1810. Note that a single logical camera object 1702 is interactively moved by the operator moving the pointing device 1206, so that the logical camera object interactively slides along the line of the graphic constraint element 1607 to any position, where the positions 1801–1806 are shown for purposes of illustration. Alternatively, the positions 1801, 1802, 1803, 1804, 1805 and 1806 may represent a predetermined number of viewpoints to provide exact divisions of intermediate view points.

FIGS. 19A–19F are 3D graphic diagrams showing the view perspective of the 3D design 1810 of FIG. 18 from each of the constrained view perspective positions 1801–1806, respectively. In particular, the operator selects the viewpoint of the logical camera object 1702, and then moves the pointing device 1206 to interactively change the display based upon the viewpoint of the camera object. The geometry processing engine continuously detects the position of the pointing device 1206, and continuously and interactively updates the display on the monitor 1202 according to the viewpoint of the logical camera object 1702. Each of the views shown in FIGS. 19A–19F represents only a snapshot of what a CAD operator sees on the screen of the monitor 1202 as a result of six particular constrained view manipulation positions 1801–1806. Note that the top surface of the 3D table object 1602 remains the focus of each scene throughout all six view perspective points 1801–1806.

In this manner, the operator defines a geometric constraint associated with a graphic object in a 3D graphic design, selects and positions a logical view object such as a logical camera, changes the viewpoint displayed on the monitor 1202 to that of the logical view device, and then moves the pointing device 1206 to interactively view the 3D graphic design at any desired angle.

Figure 20:
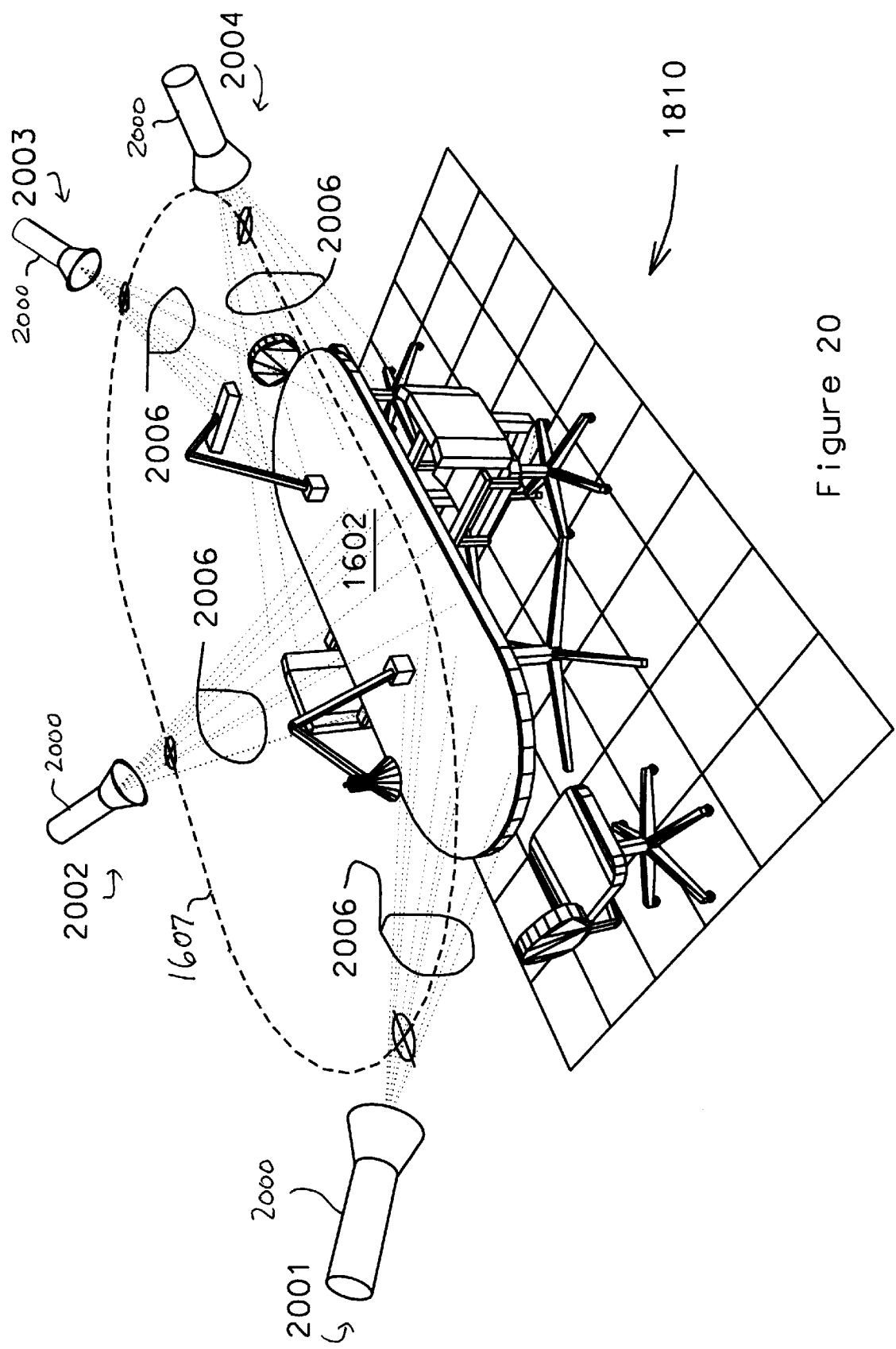
FIG. 20 is a 3D graphic diagram illustrating a series of light sources having locations constrained as applied to the visualization of an inferred assembly of 3D furniture objects of the 3D design of FIG. 18.

FIG. 20 is a 3D graphic diagram of the 3D design 1810 of FIG. 18 illustrating placement of a logical light source 2000 at any location as represented by locations 2001, 2002, 2003 and 2004, each location constrained by an applied visualization of the inferred assembly of the 3D furniture objects. The logical light source 2000 was selected and placed in association with the graphic constraint element 1607 in a similar manner as described above for the logical camera object 1702. Each of the logical light source positions 2001–2004 are oriented in accordance with the principles of the present invention, using the same interactive techniques as described previously. The logical light source 2000 is moved and rotated with respect to the graphic constraint element 1607 in a similar manner as described above for the logical camera objects 1702 to a specific positions and specific angle in order to project illumination on the top of the 3D table object 1602. Light rays are depicted as a conical shaped array of lines 2006 emanating from the logical light source 2000 in each of the positions 2001–2004 as an aid to positioning the logical light source with respect to a 3D object of interest. Alternatively, multiple logical light sources 2000 may be placed, one for each of the positions 2001–2004.

It is noted that the geometry processing engine may be implemented with commands to interactively illustrate and update the effect of one or more logical light sources 2000 while being positioned. Such effects would include shadow effects for each of the underlying graphic objects, such as the table object 1602. Alternatively, a separate post-processing portion of the geometry processing engine is executed on the 3D design 1810 after being assembled to determine and display lighting effects based on selected placement of one or more light sources.

Figure 21:
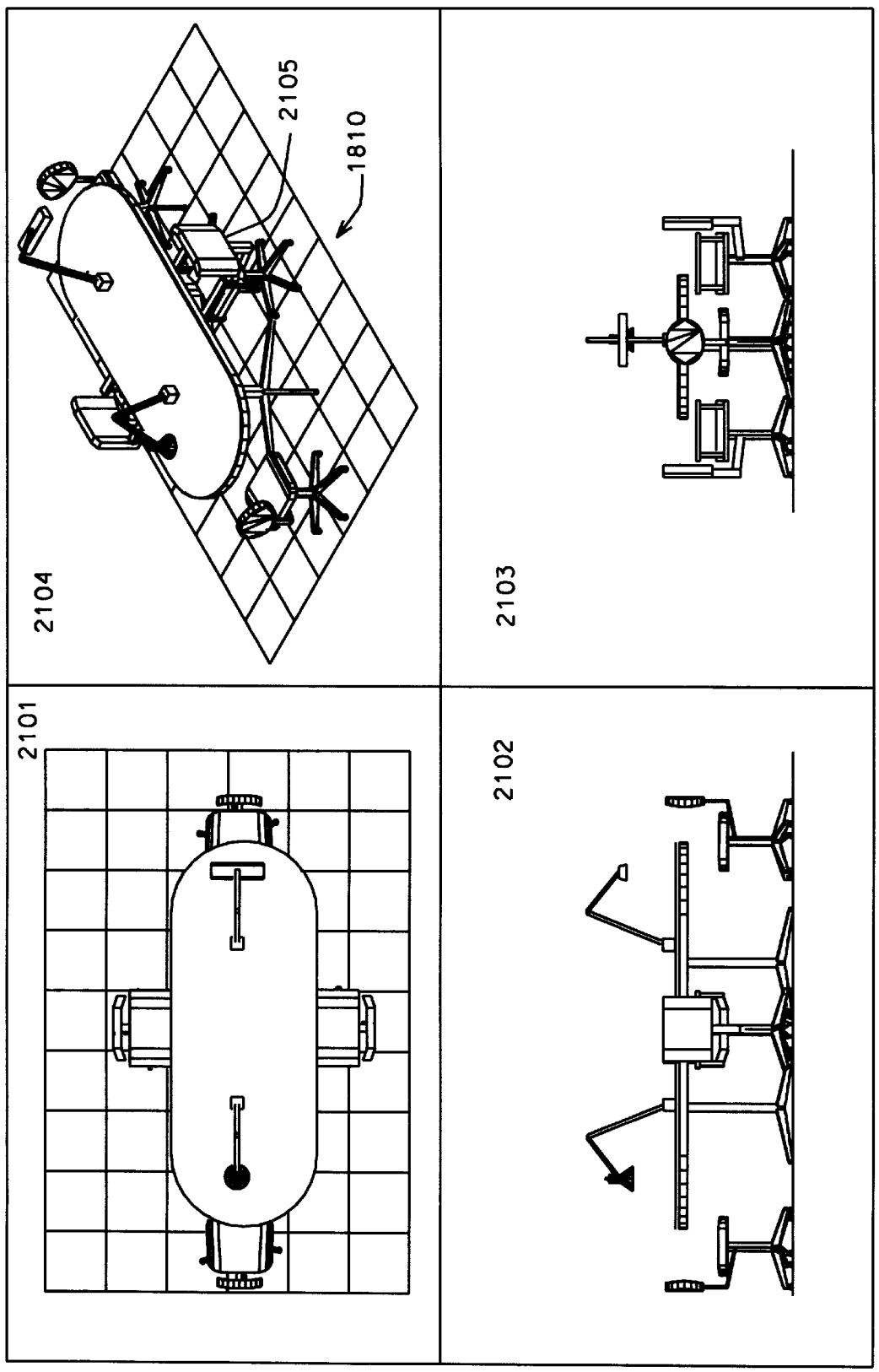
FIG. 21 depicts four simultaneous views of the 3D design of FIG. 18.

FIG. 21 depicts four simultaneous views 2101, 2102, 2103 and 2104 of the 3D design 1810. The views are used in tandem to assist the CAD operator in obtaining precise 3D coordinate points and for visualizing the exact layout of the 3D design 1810. The particular views 2101, 2102, 2103 and 2104 are drafting standard top, front, right side and isometric views, respectively.

Figure 22:
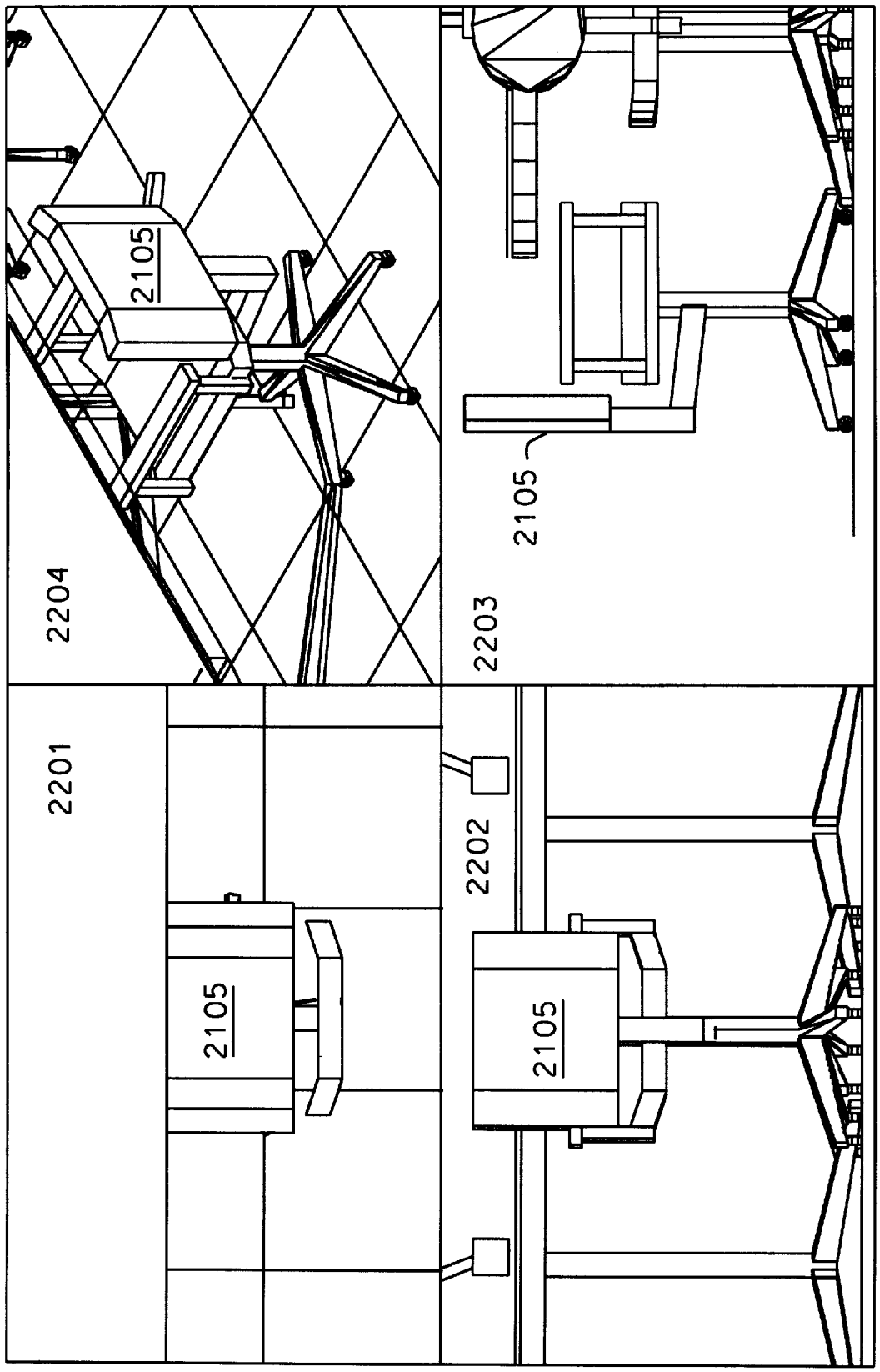
FIG. 22 illustrates a view operation to achieve multiple sized and centered views of a selected 3D object of interest in the 3D design of FIG. 18.

FIG. 22 illustrates a view operation to achieve multiple simultaneous sized and centered views 2201, 2202, 2203 and 2204 of a selected 3D object of interest. In particular, the operator has selected a 3D chair object 2105 in the 3D design 1810 of FIG. 21 for view manipulation. Again, the views 2201–2204 are drafting standard top, front, right side and isometric views, respectively, of the 3D chair object 2105. The view size for each of the simultaneous views 2201–2204 is set to 110% of the 3D extent of the chair object 2105. The geometry processing engine caused the computer graphics system to display each view centered on the object 2105.

It is now appreciated that a CAD system according to the present invention enables interactive manipulation and viewing of selected 3D objects in a 3D representation according to predefined geometric constraints and the position of an input device. A system according to the present invention automatically calculates and displays the correct geometric relationships in an interactive fashion. Thus, the present invention allows an operator to more rapidly produce accurate 3D designs that conform to predefined specifications for appearance, content and relationships among the graphic objects that convey cognition for the intent of 3D designs. The computer operator is relieved of the duty of learning the correct layout of graphic objects to assemble a valid representation of a 3D design, system or model. In effect, a system according to the present invention is an "expert" CAD system, so that the operator need not be very knowledgeable to interactively create and view 3D designs.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

I claim:

1. A method of interactively determining geometric relationships between three dimensional objects and displaying the three dimensional objects, comprising the steps of:
    detecting the position of an input device;
    moving a selected three dimensional graphic object relative to a graphic pointing symbol in a three dimensional representation according to the position of the input device;
    determining if the selected graphic object is moved to occlude an underlying three dimensional graphic object in the three dimensional representation;
    if the selected graphic object occludes the underlying three dimensional graphic object in the three dimensional representation, dynamically altering a position of the selected graphic object to agree with assembly specifications with respect to the underlying graphic object according to predetermined geometric constraints and the position of the input device; and
    dynamically moving the selected graphic object after having been dynamically altered to agree with the assembly specifications according to movement of the input device and the predetermined geometric constraints while the selected graphic object occludes the underlying graphic object.

2. The method of claim 1, wherein said dynamically moving and displaying steps further comprise the steps of:
    clinging the selected graphic object to the underlying graphic object; and
    rotatably moving and displaying the selected graphic object about the underlying graphic object corresponding to movement of the input device.

3. The method of claim 1, wherein occlusion is based on a predefined geometric graphic element associated with the underlying graphic object.

4. The method of claim 1, wherein the dynamically altering step includes the step of:
    orienting the selected graphic object according to a tangential angle with respect to the underlying graphic object at a cling point.

5. The method of claim 1, wherein the dynamically altering step includes the step of:
    positioning the selected graphic object at a predetermined offset relative to a cling point between the selected graphic object and the underlying graphic object.

6. The method of claim 1, wherein the underlying graphic object includes at least one graphic constraint element, the dynamically altering step further comprising the step of:
    aligning the selected graphic object with the underlying graphic object according to the graphic constraint element of the underlying graphic object.

7. The method of claim 1, wherein the selected graphic object and the underlying graphic object each have a graphic constraint element, wherein the dynamically altering step comprises the step of:
    aligning the selected graphic object with the underlying graphic object by aligning the respective graphic constraint elements.

8. A method of interactively displaying a three dimensional design based on geometric constraints and an input device, comprising the steps of:
    displaying a first three dimensional graphic object having a defined geometric graphic constraint element in a three dimensional representation;
    moving and displaying a second three dimensional graphic object in the three dimensional representation relative to correspond to the position of the input device;
    determining if the second graphic object is moved to occlude the geometric graphic constraint element of the first graphic object;
    dynamically altering a position of the second graphic object to agree with assembly specifications with respect to the first graphic object according to predetermined geometric constraints defined by the geometric graphic constraint element and position of the input device; and
    dynamically moving the second graphic object after it has been dynamically altered to agree with the assembly specifications according to movement of the input device and the predetermined geometric constraints while the second graphic object occludes the first graphic object.

9. The method of claim 8, wherein the second graphic object is a logical graphic object.

10. The method of claim 9, wherein the second graphic object is a logical camera object representing a viewpoint of the first graphic object.

11. The method of claim 10, further comprising the step of:
    manipulating the logical camera object with the input device to obtain a desired viewpoint of the first graphic object.

12. The method of claim 10, further comprising the step of:
    viewing the first graphic object from the viewpoint represented by the logical camera object.

13. The method of claim 10, further comprising the steps of:
    viewing the first graphic object from the viewpoint represented by the logical camera object; and
    manipulating the logical camera object by moving the input device to interactively change the display of the first graphic object according to position of the input device.

14. The method of claim 9, wherein the second graphic object is a logical light source object.

15. The method of claim 14, further comprising the step of:
    manipulating the logical light source object with the input device to obtain a desired position of the logical light source.

16. A graphics system for interactively determining geometric relationships between three dimensional objects and displaying the three dimensional objects, comprising:

a monitor for displaying graphics;

a pointing device for indicating location on said monitor a memory for storing a database of graphic display information and associated geometric constraints;

a processor for executing a geometry processing engine based on said database, said geometric constraints and the position of said pointing device for displaying a representation of three dimensional graphics on said monitor, wherein said geometry processing engine detects the position of said pointing device, moves a selected three dimensional graphic object relative to a graphic pointing symbol on said monitor according to the position of the pointing device, determines if the selected graphic object is moved to occlude an underlying three dimensional graphic object, if the selected graphic object occludes the underlying three dimensional graphic object in said three dimensional graphics, dynamically alters a position of the selected graphic object with respect to the underlying graphic object to agree with assembly specifications according to predetermined geometric constraints and the position of said pointing device, and dynamically moving the selected graphic object after it has been dynamically altered to agree with the assembly specifications according to movement of said pointing device and the predetermined geometric constraints while the selected graphic object occludes the underlying graphic object.

\* \* \* \* \*

Disclaimer 6,016,147—Brian D. Gantt, Travis County, Texas. METHOD AND SYSTEM FOR INTERACTIVELY DETERMINING AND DISPLAYING GEOMETRIC RELATIONSHIPS BETWEEN THREE DIMENSIONAL OBJECTS BASED ON PREDETERMINED GEOMETRIC CONSTRAINTS AND POSITION OF AN INPUT DEVICE. Patent dated January 18, 2000. Disclaimer filed January 22, 2001, by the assignee, Autodesk, Inc.

The term of the patent shall not extend beyond the expiration date of Pat. No. 5,572,639.
*(Official Gazette, May 1, 2001)*